(12) United States Patent
Petrillo et al.

(10) Patent No.: US 11,272,809 B2
(45) Date of Patent: Mar. 15, 2022

(54) CONTAINERS AND LIDS AND METHODS OF FORMING CONTAINERS AND LIDS

(71) Applicant: YETI Coolers, LLC, Austin, TX (US)

(72) Inventors: Matthew Joseph Petrillo, Austin, TX (US); John Alan Tolman, Austin, TX (US)

(73) Assignee: YETI Coolers, LLC, Austin, TX (US)

( * ) Notice: Subject to any disclaimer, the term of this patent is extended or adjusted under 35 U.S.C. 154(b) by 0 days.

(21) Appl. No.: 15/804,759

(22) Filed: Nov. 6, 2017

(65) Prior Publication Data

US 2018/0078093 A1 Mar. 22, 2018

Related U.S. Application Data

(63) Continuation of application No. 15/197,180, filed on Jun. 29, 2016.
(Continued)

(51) Int. Cl.
*A47J 41/00* (2006.01)
*A47J 41/02* (2006.01)
(Continued)

(52) U.S. Cl.
CPC ....... *A47J 41/0072* (2013.01); *A47J 41/0083* (2013.01); *A47J 41/02* (2013.01); *B65D 25/28* (2013.01); *B65D 53/02* (2013.01); *B65D 81/3867* (2013.01); *B65D 81/3869* (2013.01); *B65D 2525/283* (2013.01)

(58) Field of Classification Search
CPC ................ A47J 41/0072; A47J 41/0005; A47J 41/0011; A47J 41/0016; B65D 81/3869; B65D 51/1688; A47G 19/14
See application file for complete search history.

(56) References Cited

U.S. PATENT DOCUMENTS

| D105,373 S | 7/1937 | Connor |
| D109,331 S | 4/1938 | McManus et al. |

(Continued)

FOREIGN PATENT DOCUMENTS

| CN | 301110494 | 1/2010 |
| CN | 203987709 U | 12/2014 |

(Continued)

OTHER PUBLICATIONS

Yeti 36 oz. Rambler: Announced Jan. 11, 2016 [online], site visited [May 10, 2016] Available from Internet URL: http://yeticoolers.com/rambler-bottle-36-oz/.
(Continued)

*Primary Examiner* — Anthony D Stashick
*Assistant Examiner* — Blaine G Neway
(74) *Attorney, Agent, or Firm* — Banner & Witcoff, Ltd.

(57) ABSTRACT

An insulating container can be configured to retain a volume of liquid, and include a first inner wall having a first end having an opening extending into an internal reservoir, and a second outer wall forming an outer shell. The opening can be sealed by a closure, the closure having an upper portion with a handle that has a circular curvature equal to the cylindrical portion of the closure. The closure may also have a lower portion that is joined to the upper portion by an injection molded polymer element.

18 Claims, 10 Drawing Sheets

Related U.S. Application Data

(60) Provisional application No. 62/248,932, filed on Oct. 30, 2015.

(51) Int. Cl.
  *B65D 25/28* (2006.01)
  *B65D 53/02* (2006.01)
  *B65D 81/38* (2006.01)

(56) References Cited

U.S. PATENT DOCUMENTS

| | | |
|---|---|---|
| D154,378 S | 7/1949 | Fuller |
| D177,761 S | 5/1956 | Reinhardt |
| 2,963,187 A | 12/1960 | Bramming |
| D192,192 S | 2/1962 | Tupper |
| 3,089,603 A | 5/1963 | Leslie-Smith |
| 3,596,808 A * | 8/1971 | Corsette ............. B05B 11/0039 |
| | | 222/321.9 |
| D224,646 S | 8/1972 | Vollquartz |
| D235,303 S | 6/1975 | Boucher |
| D246,029 S | 10/1977 | Lynn et al. |
| 4,090,660 A | 5/1978 | Schram et al. |
| 4,202,459 A | 5/1980 | DeParales et al. |
| D256,651 S | 9/1980 | Leung et al. |
| D266,391 S | 10/1982 | Jordon |
| 4,408,703 A | 10/1983 | Libit |
| D279,346 S | 6/1985 | Ruxton |
| D281,567 S | 12/1985 | Zimmermann |
| D286,604 S | 11/1986 | Bierlein et al. |
| D286,847 S | 11/1986 | Zimmermann |
| D287,211 S | 12/1986 | Weiss |
| D290,678 S | 7/1987 | Johnson et al. |
| D300,495 S | 4/1989 | Minuti |
| D301,821 S | 6/1989 | Bartolo |
| D305,871 S | 2/1990 | Geiger |
| D316,371 S | 4/1991 | Vola |
| D321,628 S | 11/1991 | Kobayashi et al. |
| D322,753 S | 12/1991 | Sussman |
| D324,281 S | 2/1992 | Brussing |
| D324,976 S | 3/1992 | Katz |
| D327,093 S | 6/1992 | Evenson |
| D332,379 S | 1/1993 | Murphy |
| D345,676 S | 4/1994 | Biffle |
| D347,359 S | 5/1994 | Robbins, III |
| D354,915 S | 1/1995 | Schneider et al. |
| D363,666 S | 10/1995 | Goto et al. |
| D368,224 S | 3/1996 | Arndt |
| D369,525 S | 5/1996 | Winters |
| D370,300 S | 5/1996 | Gottvald et al. |
| D375,870 S | 11/1996 | Stonehouse |
| D381,906 S | 8/1997 | Bartsch |
| D391,450 S | 3/1998 | Rausch |
| D396,191 S | 7/1998 | Kuzma et al. |
| D398,193 S | 9/1998 | Sanchez |
| D404,974 S | 2/1999 | Kristinik |
| D405,609 S | 2/1999 | Fu et al. |
| D405,650 S | 2/1999 | Meier |
| D408,689 S | 4/1999 | Kato |
| D411,742 S | 6/1999 | Kokenge et al. |
| D415,395 S | 10/1999 | Hunt et al. |
| D417,127 S | 11/1999 | Steadward et al. |
| D422,916 S | 4/2000 | Herrmann |
| 6,170,693 B1 * | 1/2001 | Goto ................... A47J 41/0011 |
| | | 220/256.1 |
| D437,556 S | 2/2001 | Holliday et al. |
| 6,332,557 B1 | 12/2001 | Moran |
| D455,052 S | 4/2002 | Gullickson et al. |
| D455,612 S | 4/2002 | Gullickson et al. |
| D456,669 S | 5/2002 | Munari |
| D458,133 S | 6/2002 | Berish et al. |
| D458,134 S | 6/2002 | Berish et al. |
| D466,814 S | 12/2002 | Hurlburt |
| D470,724 S | 2/2003 | Basara |
| D471,064 S | 3/2003 | Renz |
| D474,651 S | 5/2003 | Ward |
| D479,800 S | 9/2003 | McRae |
| 6,626,326 B2 | 9/2003 | Murakami |
| D482,607 S | 11/2003 | McRae |
| D483,995 S | 12/2003 | Otake |
| D485,759 S | 1/2004 | Janky et al. |
| D494,425 S | 8/2004 | Segura |
| D497,778 S | 11/2004 | Rich |
| D502,052 S | 2/2005 | Meade |
| D504,796 S | 5/2005 | Schuler et al. |
| D521,866 S | 5/2006 | Hicks et al. |
| D524,909 S | 7/2006 | Bakke et al. |
| D525,518 S | 7/2006 | Baldwin |
| D533,032 S | 12/2006 | Liu et al. |
| D535,151 S | 1/2007 | Seum et al. |
| D536,929 S | 2/2007 | Kingsley |
| D544,749 S | 6/2007 | Seum et al. |
| D548,082 S | 8/2007 | Kingsley |
| D552,926 S | 10/2007 | Yelland |
| D553,914 S | 10/2007 | Wahl |
| D554,000 S | 10/2007 | Walsh |
| D554,503 S | 11/2007 | Kerman et al. |
| D554,993 S | 11/2007 | Kerman et al. |
| D561,470 S | 2/2008 | Jalet |
| D564,363 S | 3/2008 | Rhea |
| D568,740 S | 5/2008 | Williams |
| H2217 H | 6/2008 | Smay et al. |
| D572,585 S | 7/2008 | Perrin et al. |
| D584,623 S | 1/2009 | Chupak |
| D585,245 S | 1/2009 | Brouillette |
| D586,184 S | 2/2009 | Miller et al. |
| D587,533 S | 3/2009 | Carreno |
| D592,909 S | 5/2009 | Alviar et al. |
| D593,372 S | 6/2009 | Carreno |
| D593,811 S | 6/2009 | Carreno |
| D596,460 S | 7/2009 | Nezu |
| D601,436 S | 10/2009 | Stephens et al. |
| D603,331 S | 11/2009 | Schupp |
| D603,722 S | 11/2009 | Reimer |
| D604,181 S | 11/2009 | Reimer |
| D604,561 S | 11/2009 | Chisholm |
| D605,040 S | 12/2009 | Fry et al. |
| D605,060 S | 12/2009 | Reimer |
| D608,140 S | 1/2010 | Gilbert |
| D608,195 S | 1/2010 | Germann |
| D609,567 S | 2/2010 | Komet et al. |
| D611,346 S | 3/2010 | Camomile |
| D612,235 S | 3/2010 | Cresswell et al. |
| D614,918 S | 5/2010 | Chisholm |
| D615,360 S | 5/2010 | Joy et al. |
| D615,816 S | 5/2010 | Joy et al. |
| D616,703 S | 6/2010 | Joy et al. |
| D616,743 S | 6/2010 | Cresswell et al. |
| D616,744 S | 6/2010 | Cresswell et al. |
| D617,608 S | 6/2010 | Yang et al. |
| D618,500 S | 6/2010 | Hardaway |
| D619,457 S | 7/2010 | Walsh |
| D619,458 S | 7/2010 | Walsh |
| D619,459 S | 7/2010 | Walsh |
| D620,798 S | 8/2010 | Cresswell et al. |
| D621,257 S | 8/2010 | Gullickson et al. |
| D621,258 S | 8/2010 | Gullickson et al. |
| D622,089 S | 8/2010 | Daniel et al. |
| D622,145 S | 8/2010 | Walsh |
| D622,554 S | 8/2010 | Carreno |
| D623,062 S | 9/2010 | Gullickson et al. |
| D623,475 S | 9/2010 | Aamoudse et al. |
| D623,896 S | 9/2010 | Wahl et al. |
| D625,560 S | 10/2010 | Olson et al. |
| D625,563 S | 10/2010 | He |
| D625,564 S | 10/2010 | He |
| D625,616 S | 10/2010 | Gogola et al. |
| D626,414 S | 11/2010 | Cresswell et al. |
| D626,416 S | 11/2010 | Cresswell et al. |
| D627,600 S | 11/2010 | Eyal |
| D627,601 S | 11/2010 | Eyal |
| D627,602 S | 11/2010 | Eyal |
| D627,603 S | 11/2010 | Eyal |
| D627,604 S | 11/2010 | Eyal |

(56) References Cited

U.S. PATENT DOCUMENTS

| | | |
|---|---|---|
| D628,486 S | 12/2010 | Lane |
| D629,657 S | 12/2010 | Carreno |
| D629,689 S | 12/2010 | Cresswell et al. |
| D629,690 S | 12/2010 | Cresswell et al. |
| D629,691 S | 12/2010 | Cresswell et al. |
| D630,474 S | 1/2011 | Gilbert |
| D630,475 S | 1/2011 | Lu |
| D631,666 S | 2/2011 | Lim et al. |
| D632,522 S | 2/2011 | Wahl et al. |
| D633,338 S | 3/2011 | Rosbach et al. |
| D633,794 S | 3/2011 | Cresswell et al. |
| D633,795 S | 3/2011 | Cresswell et al. |
| D633,796 S | 3/2011 | Cresswell et al. |
| D633,797 S | 3/2011 | Cresswell et al. |
| D635,457 S | 4/2011 | Lane |
| D635,856 S | 4/2011 | Lauret |
| D638,695 S | 5/2011 | Woodrow et al. |
| D638,708 S | 5/2011 | Walsh |
| D639,164 S | 6/2011 | Walsh |
| D639,166 S | 6/2011 | Carreno |
| D639,661 S | 6/2011 | Llerena |
| D639,663 S | 6/2011 | Llerena |
| D641,591 S | 7/2011 | Tsukida |
| D643,245 S | 8/2011 | Minarsch |
| D644,060 S | 8/2011 | Komeiji |
| D644,062 S | 8/2011 | Lorenz |
| D647,753 S | 11/2011 | Lin |
| D651,847 S | 1/2012 | Gilbert |
| D652,255 S | 1/2012 | Carland |
| D652,682 S | 1/2012 | Eyal |
| D654,762 S | 2/2012 | Gilbert |
| D655,134 S | 3/2012 | Gilbert |
| D655,570 S | 3/2012 | Meehan |
| D655,581 S | 3/2012 | Kotani |
| D655,967 S | 3/2012 | Bodum |
| D657,196 S | 4/2012 | Beyers, III |
| D658,064 S | 4/2012 | Barnes et al. |
| D658,445 S | 5/2012 | Carreno |
| D659,007 S | 5/2012 | Pape |
| D660,084 S | 5/2012 | Gilbert |
| D660,655 S | 5/2012 | Wahl et al. |
| D662,360 S | 6/2012 | George |
| D663,169 S | 7/2012 | Beggins et al. |
| 8,215,511 B1 * | 7/2012 | Lin ................. B65D 51/242 215/228 |
| D664,809 S | 8/2012 | Eyal |
| D665,621 S | 8/2012 | Eyal |
| D666,052 S | 8/2012 | Trombly |
| D666,061 S | 8/2012 | Ying |
| 8,251,247 B1 | 8/2012 | Breckner |
| D667,263 S | 9/2012 | Gilbert et al. |
| D668,913 S | 10/2012 | Mayer |
| 8,276,776 B2 | 10/2012 | Roth et al. |
| D670,137 S | 11/2012 | Gilbert |
| D672,238 S | 12/2012 | Aziz et al. |
| D672,609 S | 12/2012 | Aziz et al. |
| D674,663 S | 1/2013 | Cahen |
| D675,066 S | 1/2013 | Conlin et al. |
| D675,100 S | 1/2013 | Herbst |
| D676,764 S | 2/2013 | Moore et al. |
| D677,119 S | 3/2013 | Ying |
| D678,772 S | 3/2013 | Johnson et al. |
| D679,960 S | 4/2013 | Hopkins et al. |
| D680,387 S | 4/2013 | Hopkins et al. |
| D680,389 S | 4/2013 | Zemel et al. |
| D680,431 S | 4/2013 | Hopkins et al. |
| D682,625 S | 5/2013 | Lane |
| D682,626 S | 5/2013 | Lane |
| D684,059 S | 6/2013 | Johnson et al. |
| D684,813 S | 6/2013 | Eyal |
| D685,231 S | 7/2013 | Lane |
| D686,078 S | 7/2013 | Johnson et al. |
| D688,093 S | 8/2013 | Roth et al. |
| D691,416 S | 10/2013 | Eyal |
| D692,756 S | 11/2013 | McClellan et al. |
| D693,698 S | 11/2013 | Miller, Jr. |
| D694,112 S | 11/2013 | Brown |
| D695,138 S | 12/2013 | Ball |
| D696,945 S | 1/2014 | Newman |
| D697,404 S | 1/2014 | Johnson et al. |
| D698,668 S | 2/2014 | Vaughn |
| D701,464 S | 3/2014 | Ogata et al. |
| D702,092 S | 4/2014 | Mettler et al. |
| D702,506 S | 4/2014 | Mettler et al. |
| D708,954 S | 7/2014 | Barnes et al. |
| D709,734 S | 7/2014 | Kotani |
| D710,155 S | 8/2014 | Tatsukawa |
| D712,254 S | 9/2014 | Geis et al. |
| D712,255 S | 9/2014 | Geis et al. |
| D713,268 S | 9/2014 | Jones et al. |
| D713,365 S | 9/2014 | Green |
| D715,100 S | 10/2014 | Eyal |
| D715,101 S | 10/2014 | Grcic |
| D717,102 S | 11/2014 | Taketani et al. |
| D717,115 S | 11/2014 | Lane et al. |
| D719,788 S | 12/2014 | Soltz et al. |
| D721,540 S | 1/2015 | Grcic |
| D721,546 S | 1/2015 | Davidson |
| D724,385 S | 3/2015 | Hurley et al. |
| D725,968 S | 4/2015 | George |
| D727,688 S | 4/2015 | Hewitt et al. |
| D728,314 S | 5/2015 | Carstensen et al. |
| D728,315 S | 5/2015 | Bo |
| D728,995 S | 5/2015 | Barberi |
| D729,579 S | 5/2015 | Molayem |
| D729,581 S | 5/2015 | Boroski |
| D729,584 S | 5/2015 | Weston et al. |
| 9,027,774 B2 | 5/2015 | Palmer |
| D731,251 S | 6/2015 | Lane |
| D732,337 S | 6/2015 | Coon et al. |
| D732,347 S | 6/2015 | Katterheinrich et al. |
| D732,402 S | 6/2015 | Jones et al. |
| D734,096 S | 7/2015 | George et al. |
| D734,154 S | 7/2015 | Johnson et al. |
| D735,578 S | 8/2015 | Mazurkiewicz et al. |
| D741,655 S | 10/2015 | Whelan et al. |
| D743,742 S | 11/2015 | Rummel et al. |
| D744,781 S | 12/2015 | Rummel et al. |
| D747,199 S | 1/2016 | Phillips |
| D751,340 S | 3/2016 | Seiders et al. |
| D751,341 S | 3/2016 | Seiders et al. |
| D752,381 S | 3/2016 | Wahl |
| D754,472 S | 4/2016 | Munari |
| D755,561 S | 5/2016 | Eyal |
| D756,701 S | 5/2016 | Mettler et al. |
| D758,859 S | 6/2016 | Sorensen et al. |
| D760,080 S | 6/2016 | Gorbold |
| D760,586 S | 7/2016 | Seiders et al. |
| D761,618 S | 7/2016 | Lapsker |
| D764,869 S | 8/2016 | Smrtnik et al. |
| D764,916 S | 8/2016 | Mount, III et al. |
| D766,085 S | 9/2016 | Smith |
| D772,651 S | 11/2016 | Leonard et al. |
| D774,363 S | 12/2016 | Seiders et al. |
| D777,508 S | 1/2017 | Goodwin et al. |
| D779,872 S | 2/2017 | Bergstrom |
| D780,527 S | 3/2017 | Salama |
| D780,577 S | 3/2017 | Seiders et al. |
| D781,145 S | 3/2017 | Seiders et al. |
| D781,146 S | 3/2017 | Seiders et al. |
| D782,881 S | 4/2017 | Seiders et al. |
| D783,367 S | 4/2017 | Seiders et al. |
| D783,368 S | 4/2017 | Seiders et al. |
| D786,023 S | 5/2017 | Polack et al. |
| D786,671 S | 5/2017 | Khetarpaul et al. |
| D788,544 S | 6/2017 | Seiders et al. |
| D790,285 S | 6/2017 | Seiders et al. |
| D794,397 S | 8/2017 | Seiders et al. |
| D795,020 S | 8/2017 | Seiders et al. |
| D799,898 S | 10/2017 | Yao |
| D799,907 S | 10/2017 | Seiders et al. |
| D801,753 S | 11/2017 | Piper et al. |
| D803,005 S | 11/2017 | Lane |
| D804,255 S | 12/2017 | Seiders et al. |

(56) References Cited

U.S. PATENT DOCUMENTS

| | | | |
|---|---|---|---|
| D804,256 S | 12/2017 | Seiders et al. | |
| D805,852 S | 12/2017 | Seiders et al. | |
| D807,125 S | 1/2018 | Seiders et al. | |
| D807,126 S | 1/2018 | Seiders et al. | |
| D808,713 S | 1/2018 | Rane et al. | |
| D808,731 S | 1/2018 | Boroski et al. | |
| D808,732 S | 1/2018 | Boroski | |
| D808,733 S | 1/2018 | Spivey et al. | |
| D809,344 S | 2/2018 | Guthrie | |
| 2005/0153637 A1* | 7/2005 | Janson | B24B 23/005 451/359 |
| 2008/0078787 A1 | 4/2008 | Yelland | |
| 2010/0288782 A1 | 11/2010 | Lin | |
| 2011/0114655 A1 | 5/2011 | Bailey | |
| 2011/0186585 A1 | 8/2011 | Lu | |
| 2012/0125931 A1 | 5/2012 | Roth et al. | |
| 2014/0251938 A1 | 9/2014 | Rose et al. | |
| 2014/0353275 A1 | 12/2014 | Hung | |
| 2015/0232232 A1* | 8/2015 | Shibuki | B65D 25/14 220/592.16 |
| 2017/0119212 A1 | 5/2017 | Petrillo et al. | |

FOREIGN PATENT DOCUMENTS

| | | | |
|---|---|---|---|
| CN | 303528321 | 12/2015 | |
| CN | 303905254 | 11/2016 | |
| DE | 29707837 U1 | 7/1997 | |
| EP | 2567909 A1 | 3/2013 | |
| FR | 993552 A * | 11/1951 | |
| GB | 678830 A * | 9/1952 | A47J 41/0011 |
| JP | 2014210613 A | 11/2014 | |
| JP | 1530358 | 8/2015 | |
| KR | 300303813.0000 | 8/2002 | |
| KR | 300751936.0000 | 7/2014 | |
| KR | 300764889.0000 | 10/2014 | |
| WO | O088688-002 | 1/2016 | |

OTHER PUBLICATIONS

KOLD Vacuum Insulated Stainless Steel Sports Bottle: Announced Dec. 8, 2015 [online], site visited [May 11, 2016]. Available from Internet URL: http://www.amazon.com/KOLD-Sports-Water-Bottles-Insulated/dp/B018YH K79E/ref=cm.

"Hydro Flask Insulated Stainless Steel Water Bottle" published on Dec. 29, 2014, retrieved from http://web.archive.org/web/*/https://www.amazon.com/dp/B004X55L9I/ref=twister_B00GA03LG4?_encoding=UTF8&psc=1 on Sep. 22, 2016.

"UA Beyond 18 oz. Vacuum Insulated Water Bottle" published on Mar. 29, 2015, retrieved from http://web.archive.org/web/*/https://www.underarmour.com/en-us/beyond-18-oz-vacuum-insulated-ss-bottle-with-flip-top-lid/pid1232014 on Sep. 22, 2016.

"Klean Kanteen Insulated Classic with Polypropylene" published on Jul. 7, 2015, retrieved from http://web.archive.org/web/*/https://www.lifewithoutplastic.com/store/klean-kanteen-insulated-classic-with-polypropylene-loop-cap-0-95-I-32-oz.html on Sep. 22, 2016.

"Eco Vessel 64 ounce Growler" published on Jan. 28, 2015, retrieved from http://web.archive.org/web/*/http://www.snewsnet.com/press-release/eco-vessel-launches-the-boss-insulated-growler/ on Sep. 22, 2016.

"64 oz Double-Wall Vacuum-Insulated Growler" published on Nov. 14, 2014, retrieved from https://web.archive.org/web/*/http://www.fiftyfiftybottles.com/64oz-growler/ on Sep. 22, 2016.

"2015 Boulder Insulated Water Bottle with Tea, Fruit, Ice Strainer" published on Jun. 28, 2015, retrieved from http://web.archive.org/web/*/http://www.ecovessel.com/boulder-insulated-water-bottle-with-tea-fruit-ice-strainer-20-oz/ on 9/22.

"KB8 20 oz. Double Wall Stainless Bottle," published on May 22, 2015, retrieved from https://web.archive.org/web/20150807054814/http://thermo-steel.com/work/keen-kb8 on Sep. 27, 2016.

English translation of Office Action dated Sep. 6, 2016 for JP Application No. 2016-9603, 4 pages.

English translation of Office Action dated Sep. 6, 2016 for JP Application No. 2016-9604, 3 pages.

English translation of Office Action dated Nov. 1, 2016 for JP Application No. 2016-9605, 2 pages.

English translation of Office Action dated Nov. 1, 2016 for JP Application No. 2016-9606, 2 pages.

English translation of Office Action dated Oct. 4, 2016 for JP Application No. 2016-9607, 2 pages.

English translation of Office Action dated Oct. 4, 2016 for JP Application No. 2016-9608, 2 pages.

Feb. 6, 2017—(WO) International Search Report and Written Opinion—App No. PCT/US2016/059481—12 pages.

United States District Court Western District of Texas Austin Division, "Plaintiff YETI Coolers, LLC's Original Complaint," *YETI Coolers, LLC v. Ontel Products Corporation and World Pack USA, LLC*, Case: 1:17-cv-00091-RP, Document #1, filed Feb. 8, 2017, 65 pages.

United States District Court Western District of Texas Austin Division, "Defendants' Answers and Defenses to Plaintiffs Original Complaint," *YETI Coolers, LLC v. Ontel Products Corporation and World Pack USA, LLC*, Case: 1:17-cv-00091-RP, Document #14, filed Mar. 21, 2017, 45 pages.

"Classic Vacuum Bottle—1.1 qt," published on Feb. 22, 2015, retreived from http://www.amazon.com/Stanley-Classic-VAcuum-Bottle-1-1qt/dp/images/B004E7NY3U/ref=dp_image_1_0?ie=UTF8&s=sporing-goods&img=color_name=1.

United States District Court Western District of Texas Austin Division, "Plaintiffs' Complaint for Damages and Injunctive Relief," *YETI Coolers, LLC v. Houssam Rabi d/b/a Hoo-Sizzy*, Case 1:17-cv-00418, Document 1, filed May 5, 2017, 84 pages.

United States District Court Western District of Texas Austin Division, "Plaintiffs' Complaint for Damages and Injunctive Relief," *YETI Coolers, LLC v. Seth Stevens d/b/a SDS Marketing d/b/a Eskimo Coolers, Panther Group LLC d/b/a Eskimo Coolers, Panther Group Sales, LLC d/b/a Eskimo Coolers, and Silver Fox Sales, LLC*, Case 1:17-cv-00423, Document 1, filed May 5, 2017, 283 pages.

United States District Court Western District of Texas Austin Division, "Plaintiffs' First Amended Complaint," *YETI Coolers, LLC v. RTIC Coolers, LLC, RTIC Drinkware, LLC, and RTIC Web Services, LLC*, Case 1:16-cv-00985-RP, Document 15, filed Oct. 14, 2016, 26 pages.

United States District Court Western District of Texas Austin Division, "Defendants' Notice of Responsive Pleading to Plaintiffs First Amended Complaint," *YETI Coolers, LLC v. RTIC Coolers, LLC, RTIC Drinkware, LLC, and RTIC Web Services, LLC*, Case 1:16-cv-00985-RP, Document 23, filed Oct. 26, 2016, 4 pages.

United States District Court Western District of Texas Austin Division, "Second Amended Complaint," *YETI Coolers, LLC v. Sam's West, Inc., and Sam's East, Inc., and CY Top, Ltd.*, Case: 1:16-cv-00829-RP, Document #51, filed Sep. 22, 2017, 49 pages.

United States District Court Western District of Texas Austin Division, "Complaint," *YETI Coolers, LLC v. Costco Wholesale Corporation*, Case: 1:17-cv-07025, Document #1, filed Sep. 28, 2017, 99 pages.

United States District Court Western District of Texas Austin Division, "Complaint," *YETI Coolers, LLC v. Alibaba Group Holding Limited, Alibaba (China) Technology Co., Ltd., Alibaba.com Hong Kong Limited, Alibaba.com Singapore E-Commerce Private Limited, Hangzhou Alibaba Advertising Co. Ltd., and Huizhou Dashu Trading Co., Ltd*, Case: 1:17-cv-00936, Document #1, filed Sep. 28, 2017, 272 pages.

United States District Court Western District of Texas Austin Division, "Complaint," *YETI Coolers, LLC v. SF Associates, Inc.*, Case: 1:17—cv—01070, Document #1, filed Nov. 10, 2017, 39 pages.

United States International Trade Commision Washington, DC, Respondents Alibaba, Dunhuang Group, and Bonanaza.com's "Notice of Prior Art", Inv. No. 33-TA-1084 dated Feb. 9, 2018, 8 pages.

United States District Court Western District of Texas Austin Division, "Complaint for Damages and Injunctive Relief," *YETI*

(56) References Cited

OTHER PUBLICATIONS

*Coolers, LLC* v. *RTIC Coolers, LLC, RTIC Drinkware, LLC, and RTIC Web Services, LLC,* Case: 1:16-cv-00985, Document #1, filed Aug. 18, 2016, 27 pages.
United States District Court Western District of Texas Austin Division, "Defendants' Motion to Dismiss Pursuant to Rule 12(b)(6)," *YETI Coolers, LLC* v. *RTIC Coolers, LLC, RTIC Drinkware, LLC and RTIC Web Services, LLC,* Case: 1:16-cv-00985. Document #9, filed Sep. 23, 2016, 27 pages.
United States District Court Western District of Texas Austin Division, "Defendants' Answers and Defenses to Plaintiffs Driginal Complaint," *YETI Coolers, LLC* v. *Ontel Products Corporation and World Pack USA, LLC,* Case: 1:17-cv-00091-RP, Document #14, filed Feb. 21, 2017, 45 pages.
Yeti. Rambler. Jul. 19, 2016 [earliest online date], [site visited Apr. 7, 2017], Available from internet, <URL: http://yeti.com/rambler>.
Amazon. YETI Rambler Bottle Replacement Cap. Mar. 23, 2017 [earliest online date], [site visited Apr. 7, 2017]. Available from Internet, <URL: https://www.amazon.com/YETI-Rambler-Bottle-Replacement-Cap/dp/B01MZ6QIMY>.
Outdoor Pro Shop. Yeti Rambler Bottles. May 27, 2016 {earliest online date], [site visited Apr. 7, 2017]. Available from Internet, <URL: https://www.outdoorproshop.com/Yeti-Rambler-Bottles-p/yeti-yrambtl.htmOu>.
"Review: Yeti Heavy-Duty Rambler Bottles". Found online Jun. 12, 2017 at gearjunkie.com. Page dated Apr. 1, 2016. Retrieved from <https://gearjunkie.com/yeti-rambler-water-bottle-review>.
"ETS Express: New Items in Stock". Found online Jun. 12, 2017 at twitter.com. Page dated Jan. 21, 2015. Retrieved from <https://twitter.com/etsexpress/status/557997114589196288>.
"Klean Kanteen Wide Mouth Water Bottle with Loop Cap". Found online Oct. 12, 2016 at amazon.com. Page dated Dec. 5, 2009. Retrieved from <https://www.amazon.com/Klean-Kanteen-Mouth-Water-Bottle/dp/B002VIZ61U/ref=cm_cr_arp_d_product_top?ie=UTF8>.
"Sketch-a-Day: Water Bottles". Found online Jun. 21, 2017 at sketch-a-day.com. Page dated Mar. 4, 2010. Retrieved from <http://www.sketch-a-day.com/posts/sketch-a-day-95-water-bottles/>.
United States District Court Western District of Texas Austin Division, "Plaintiffs' Complaint for Damages and Injunctive Relief," *YETI Coolers, LLC* v. *Houssam Rabi d/b/a Hoo-Sizzy,* Case 1:17-cv-00418, Document 1, filed May 5, 2017, 37 pages.
United States District Court Western District of Texas Austin Division, "Plaintiffs' Complaint for Damages and Injunctive Relief," *YETI Coolers, LLC* v. *Seth Stevens d/b/a SDS Marketing d/b/a Eskimo Coolers, Panther Group LLC d/b/a Eskimo Coolers, Panther Group Sales, LLC d/b/a Eskimo Coolers, and Silver Fox Sales, LLC,* Case 1:17-cv-00423, Document 1, filed May 5, 2017, 77 pages.
"Bubba Brands Classic Insulated Travel Mug". Found online Mar. 9, 2017 at amazon.com. Page dated Sep. 30, 2010. Retrieved from https://www.amazon.com/Bubba-Brands-1953403-Classic-Insulated/dp/B01FB7IG8Y/ref=cm_cr_arp_d_product_top?ie=UTF8.
"Bubba HERO Bottle Replacement Lid". Found online Mar. 9, 2017 at amazon.com. Page dated Jan. 14, 2015. Retrieved from https://www.amazon.com/bubba-HERO-bottle-replacement-lid/dp/B00QQYDI44/ref=cm_cr_arp_d_product_top?ie=UTF8.
"Contigo Extreme Stainless Steel Travel Mug". Found online Mar. 9, 2017 at amazon.com. Page dated Sep. 13, 2016. Retrieved from https://www.amazon.com/Contigo-Extreme-Stainless-Insulated-Limited/dp/B01LZGBMKT/ref-pd_sim_79_3?_encoding=UTF8&psc=&refRID=A4VHP8EG6AKH3BG73BMZ.
"Hydro Flask Wide Mouth Hydro Flip Lid". Found online Mar. 9, 2017 at amazon.com. Page dated Oct. 9, 2012. Retrieved from http://www.amazon.com/Hydro-Flask-Wide-Mouth-Black/dp/B01GW2H430/ref=cm_cr_arp_d_product_top?ie=UTF8.
Hydro Flask. Hydro Flip. 2015 [earliest online date], [site visited Apr. 28, 2017]. Available from Internet, <URL:https://www.hydroflask.com/hydro-flilp#92=57>.
Jane. Spill Resistant Flip Lid and Yeti Accessories. Dec. 5, 2016 [earliest online date], [site visited Apr. 28, 2017]. Available from Internet, <URL:https://jane.com/deal/263319/spill-resistant-flip-lid-and-yeti-accessories-30oz-many-colors>.
United States International Trade Commission, "Respondents Alibaba, Dunhuang Group, and Bonanza.com's Notice of Prior Art," In the Matter of: Certain Insulated Beverage Containers, Components, Labels, and Packaging Materials Thereof, Inv. No. 337-TA-1084, filed Feb. 9, 2018, 8 pages.
United States International Trade Commission, "Respondent Contextlogic, Inc.'s Notice of Prior Art," In the Matter of: Certain Insulated Beverage Containers, Components, Labels, and Packaging Materials Thereof, Inv. No. 337-TA-1084, filed Feb. 9, 2018, 15 pages.
United States International Trade Commission, "The Commission Investigative Staff's Notice of Prior Art" In the Matter of: Certain Insulated Beverage Containers, Components, Labels, and Packaging Materials Thereof, Inv. No. 337-TA-1084, filed Feb. 9, 2018, 4 pages.
United States International Trade Commission of Washington, DC, "Complaint Under Section 337 of the Tariff Act of 1930, as Amended," *YETI Coolers, LLC* vs. *Alibaba (China) Technology Co., Ltd., Alibaba Group Holding Limited, Alibaba.com Hong Kong Limited, Alibaba.com Singapore E-Commerce Private Limited, Bonanza. com, Inc., ContextLogic, Inc. d/b/a Wish, Dunhuang Group, Hangzhou Alibaba Advertising Co. Ltd., Huizhou Dashu Trading Co., Ltd, Huagong Trading Co., and Tan Er Pa Technology Co., Ltd.,* filed Sep. 28, 2017, 191 pages.
United States District Court Southern District of Texas, Houston Division, "Complaint", *YETI Coolers, LLC* v. *Igloo Products Corporation,* Case 4:21-cv-03203, filed Oct. 1, 2021, 54 pages.
U.S. International Trade Commission of Washington, DC, "Complaint Under Section 337 of the Tariff Act of 1930, as Amended," *YETI Coolers, LLC* vs. *Alibaba (China) Technology Co., Ltd., Alibaba Group Holding Limited, Alibaba.com Hong Kong Limited, Alibaba.com Singapore E-Commerce Private Limited, Bonanza. com, Inc., ContextLogic, Inc. d/b/a Wish, Dunhuang Group, Hangzhou Alibaba Advertising Co. Ltd., Huizhou Dashu Trading Co., Ltd, Huagong Trading Co., and Tan Er Pa Technology Co., Ltd.,* Case: 337-TA-3261, filed Sep. 28, 2017, 191 pages.
United States District Court Western District of Texas Austin Division, "Complaint," *YETI Coolers, LLC* v. *ContextLogic, Inc. d/b/a Wish.com,* Case: 1:17-cv-00937, Document #1, filed Sep. 28, 2017, 238 pages.
United States District Court Western District of Texas Austin Division, "Complaint," *YETI Coolers, LLC* v. *Dunhuang Group, SZ Flowerfairy Technology Co., Ltd., Tan Er Pa Technology Co., Ltd., Shenzhen Great Electronic Technology Co., Ltd., and Huagong Trading Co.,* Case: 1:17-cv-00938, Document #1, filed Sep. 28, 2017, 272 pages.

* cited by examiner

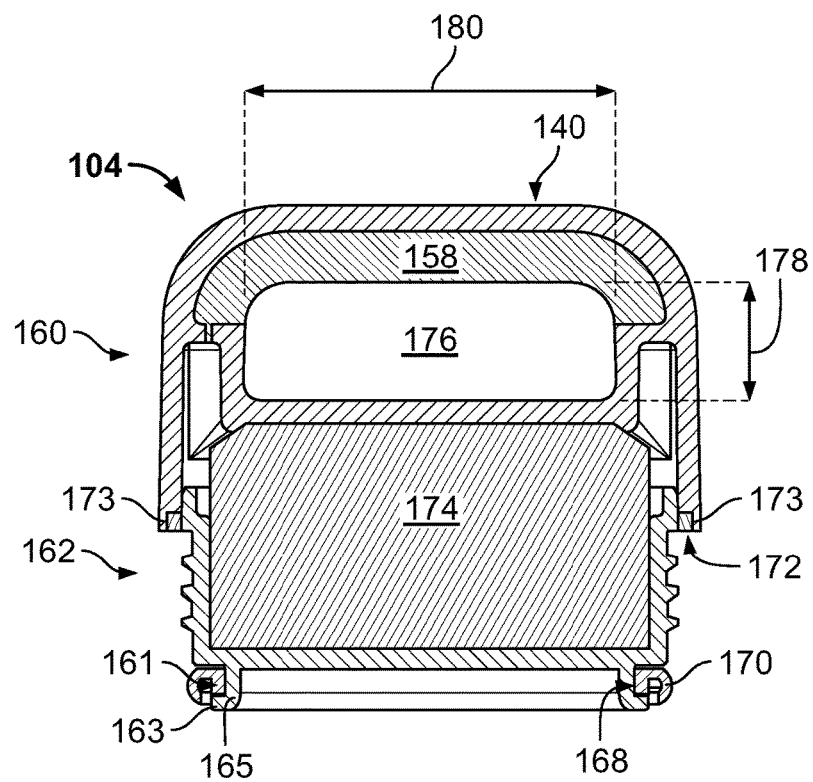
FIG. 5
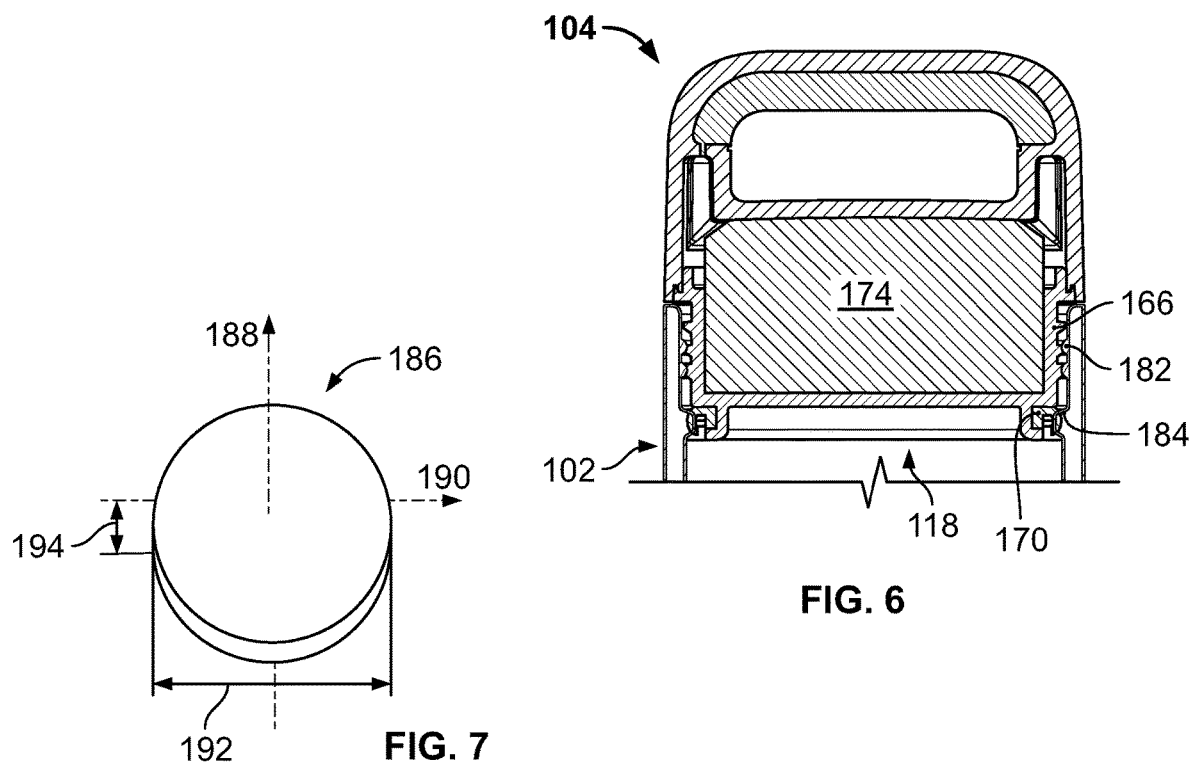
FIG. 7
FIG. 6

US 11,272,809 B2

CONTAINERS AND LIDS AND METHODS OF FORMING CONTAINERS AND LIDS

CROSS REFERENCE TO RELATED APPLICATIONS

This application is a continuation of U.S. application Ser. No. 15/197,180, filed 29 Jun. 2016, titled "CONTAINERS AND LIDS AND METHODS OF FORMING CONTAINERS AND LIDS," and claims the benefit of and priority to U.S. Provisional Patent Application No. 62/248,932, filed on Oct. 30, 2015. These earlier applications are expressly incorporated herein by reference in their entirety for any and all non-limiting purposes.

BACKGROUND

A container may be configured to store a volume of liquid. Containers can be filled with hot or cold drinkable liquids, such as water, coffee, tea, a soft drink, or an alcoholic beverage, such as beer. These containers can be formed of a double-wall vacuumed formed construction to provide insulative properties to help maintain the temperature of the liquid within the container.

BRIEF SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

In certain examples, an insulating device can be configured to retain a volume of liquid. The insulating device can include a container with a first inner wall having a first end with an opening extending into an internal reservoir for receiving liquid, along with a second outer wall and a bottom portion forming an outer shell of the container. The bottom portion may form a second end configured to support the container on a surface.

The insulating device may include a lid configured to seal the opening of the container, and having an upper portion coupled to a lower portion by an injection molded polymer element using a three-shot injection molding process.

BRIEF DESCRIPTION OF THE DRAWINGS

The present disclosure is illustrated by way of example and not limited in the accompanying figures in which like reference numerals indicate similar elements and in which:

FIG. 5 depicts a cross-sectional view of the lid of FIG. 4, according to one or more aspects described herein.

FIG. 6 depicts an enlarged cross-sectional view of the lid removably coupled to a container, according to one or more aspects described herein.

FIG. 7 schematically depicts a vacuum-insulated puck, according to one or more aspects described herein.

Further, it is to be understood that the drawings may represent the scale of different components of various examples; however, the disclosed examples are not limited to that particular scale.

DETAILED DESCRIPTION

In the following description of the various examples, reference is made to the accompanying drawings, which form a part hereof, and in which is shown by way of illustration various examples in which aspects of the disclosure may be practiced. It is to be understood that other examples may be utilized and structural and functional modifications may be made without departing from the scope and spirit of the present disclosure.

Figure 1:
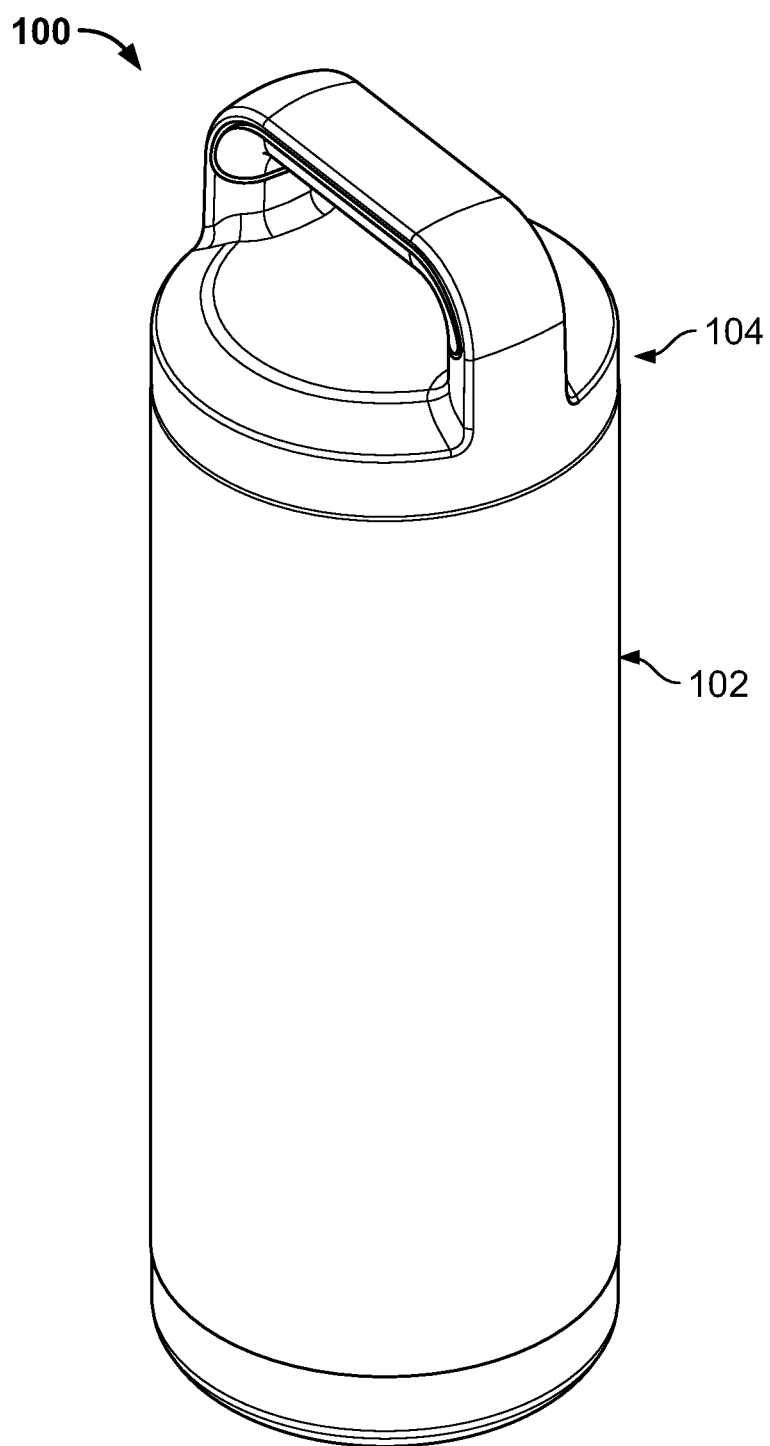
FIG. 1 depicts an isometric view of an example insulating device, according to one or more aspects described herein.

FIG. 1 depicts an isometric view of an insulating device 100. In one example, the device 100 may be configured to store a volume of liquid. The device 100 may comprise a container 102 and a lid or closure 104 that may be removably coupled thereto. In one example, the container 102 may be substantially cylindrical in shape. As such, in one example, the container 102 may be referred to as a canister. In various examples, the container 102 may be referred to as a bottom portion, base, or insulated base structure having a substantially cylindrical shape.

Figure 2:
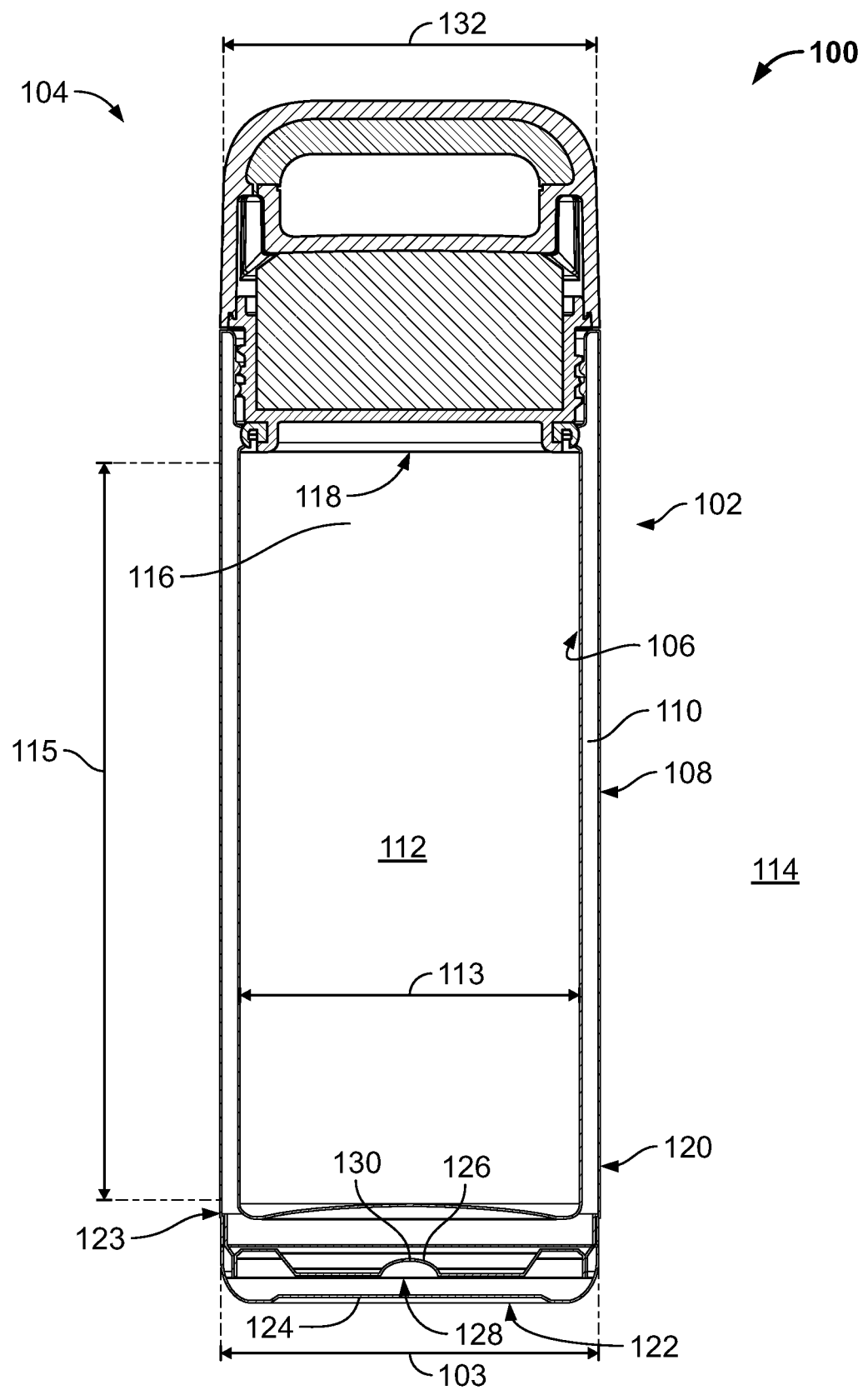
FIG. 2 depicts a cross-sectional view of the device of FIG. 1, according to one or more aspects described herein.

FIG. 2 depicts a cross-sectional view of the insulating device 100. As such, the device 100 may include a first inner wall 106 and a second outer wall 108. A sealed vacuum cavity 110 may be formed between the first inner wall 106 and the second outer wall 108. This construction may be utilized to reduce heat transfer through the first inner wall 106 and the second outer wall 108 between a reservoir 112, which is configured to receive a mass of liquid, and an external environment 114. As such, the sealed vacuum cavity 110 between the first inner wall 106 and the second outer wall 108 may be referred to as an insulated double-wall structure. Additionally, the first inner wall 106 may have a first end 116 that defines an opening 118 extending into the internal reservoir 112 for receiving a mass of liquid. The second outer wall 108 may form an outer shell of the device 100. The second outer wall 108 may be formed of a side wall 120 and a bottom portion 122, which forms a second end 124 to support the device 100 on a surface. A seam 123 can be formed between the second outer wall 108 and the bottom portion 122. In one example, the bottom portion 122 can be press-fit onto the second outer wall 108. Additionally the bottom portion 122 can be welded to the second outer wall 108. The weld may also be polished such that the seam does not appear on the bottom of the device 100.

The bottom portion 122 may include a dimple 126 that is used during a vacuum formation process. As shown in FIG. 2, the bottom portion 122 covers the dimple 126 such that the dimple 126 is not visible to the user. The dimple 126 may generally resemble a dome shape. However, other suitable shapes are contemplated for receiving a resin material during the manufacturing process, such as a cone, or frustoconical shape. The dimple 126 may include a circular base 128 converging to an opening 130 extending into the second outer wall 108. As discussed below, the opening 130 may be sealed by a resin (not shown). During the formation of the vacuum between the first inner wall 106 and the second outer wall 108, the resin may seal the opening 130 to provide the sealed vacuum cavity 110 between the first inner wall 106 and the second outer wall 108 in formation of the insulated double-wall structure.

In alternative examples, the dimple 126 may be covered by a correspondingly-shaped disc (not shown) such that the dimple 126 is not visible to the user. The circular base 128 may be covered by a disc, which can be formed of the same material as the second outer wall 108 and the first inner wall 106. For example, the first inner wall 106, the second outer wall 108, and the disc may be formed of titanium, stainless steel, aluminum, or other metals or alloys. However, other suitable materials and methods for covering the dimple 126 are contemplated as discussed herein and as discussed in U.S. application Ser. No. 62/237,419, which is incorporated fully by reference as set forth fully herein.

As such, the container 102 may be constructed from one or more metals, alloys, polymers, ceramics, or fiber-reinforced materials. Additionally, container 102 may be constructed using one or more hot or cold working processes (e.g. stamping, casting, molding, drilling, grinding, forging, among others). In one implementation, the container 102 may be constructed using a stainless steel. In specific examples, the container 102 may be formed substantially of 304 stainless steel or a titanium alloy. Additionally, one or more cold working processes utilized to form the geometry of the container 102 may result in the container 102 being magnetic (may be attracted to a magnet).

In one example, the reservoir 112 of the container 102 may have an internal volume of 532 ml (18 fl. oz.). In another example, the reservoir 112 may have an internal volume ranging between 500 and 550 ml (16.9 and 18.6 fl. oz.). In yet another example, the reservoir 112 may have an internal volume of at least 100 ml (3.4 fl. oz.), at least 150 ml (5.1 fl. oz.), at least 200 ml (6.8 fl. oz.), at least 400 ml (13.5 fl. oz.), at least 500 ml (16.9 fl. oz.), or at least 1000 ml (33.8 fl. oz.). The opening 118 in the container 102 may have an opening diameter of 64.8 mm. In another implementation, the opening 118 may have an opening diameter at or between 60 and/or 70 mm. The reservoir 112 may have an internal diameter 113 and a height 115 configured to receive a standard-size 355 ml (12 fl. oz.) beverage (aluminum) can (standard 355 ml beverage can with an external diameter of approximately 66 mm and a height of approximately 122.7 mm). Accordingly, the internal diameter 113 may measure at least 66 mm and can be at or between 50 mm and/or 80 mm. The height 115 may measure at least 122.7 mm and can be at or between 110 mm and/or 140 mm. In one example, the container 102 may have an outer diameter 103 measuring approximately 76.2 mm. In other examples, the outer diameter 103 may be at between 60 and/or 90 mm. Further, the lid 102 may have an outer diameter 132 approximately equal to the outer diameter 103 of the container 102.

Additional or alternative methods of insulating the device 100 are also contemplated. For example, the cavity 110 between the first inner wall 106 and the outer walls 108 may be filled with various insulating materials that exhibit low thermal conductivity. As such, the cavity 110 may, in certain examples, be filled, or partially filled, with air to form air pockets for insulation or a mass of material such as a polymer material, or a polymer foam material. In one specific example, the cavity 110 may be filled, or partially filled, with an insulating foam, such as polystyrene. However, additional or alternative insulating materials may be utilized to fill, or partially fill, the cavity 110, without departing from the scope of these disclosures.

Moreover, a thickness of the cavity 110 may be embodied with any dimensional value, without departing from the scope of these disclosures. Also, an inner surface of one or more of the first inner wall 106 or the second outer wall 108 of the device 100 may comprise a silvered surface, copper plated, or covered with thin aluminum foil configured to reduce heat transfer by radiation. It is also contemplated that the lid 104 may be insulated using the techniques described herein.

Figure 3:
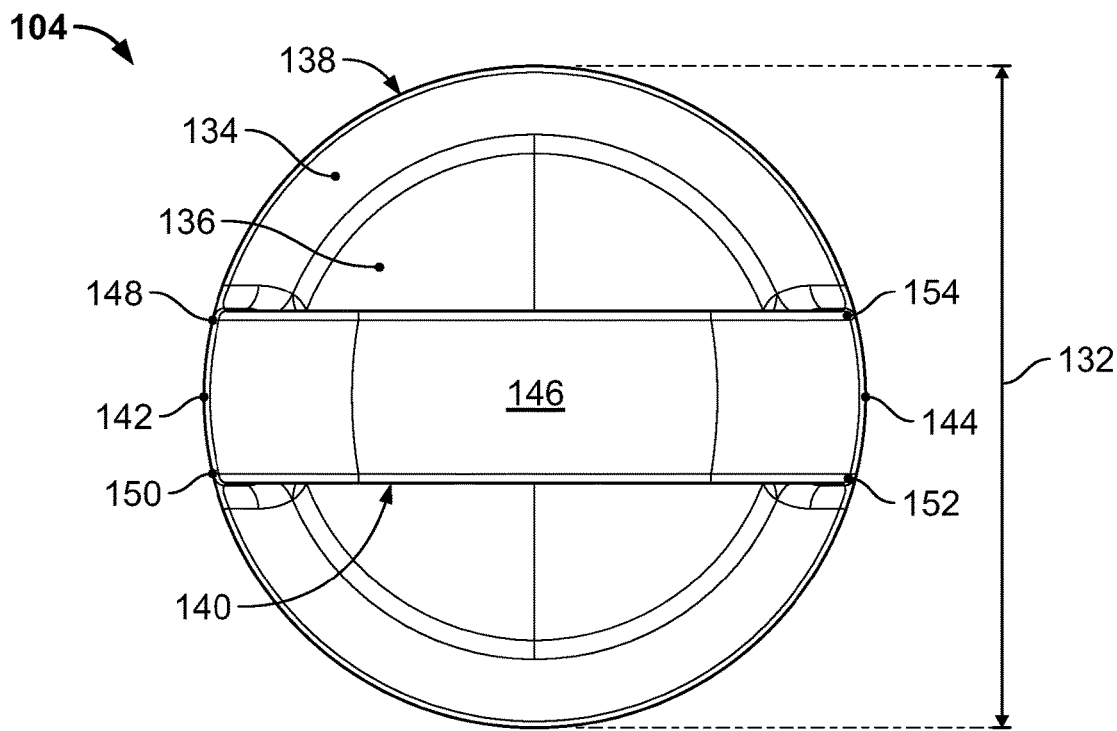
FIG. 3 depicts a top view of a lid of the insulating device of FIG. 1, according to one or more aspects described herein.

As depicted in FIG. 2, the lid 104 may be configured to be removably-coupled to, and seal the opening 118 in the container 102. FIG. 3 depicts a top view of the lid 104 with an outer diameter 132. In one example, outer diameter 132 may measure approximately 75.8 mm. In another example, outer diameter 132 may measure at or between approximately 60 and/or 90 mm. However, outer diameter 132 may be embodied with any dimensional value without departing from these disclosures. The lid 104 may be formed as a frustoconical surface 134 spaced between a circular top surface 136 and a cylindrical surface 138. A handle 140 may be integrally-molded to the frustoconical surface 134, and coupled to the lid 104 at two diametrically-opposed points 142 and 144. In one example, the handle 140 may have an outer surface 146, with at least a portion of the outer surface 146 having circular curvature concentric with, and having a radius equal to, the cylindrical surface 138. For example, the circular curvature of the outer surface 146 may be concentric with, and have a radius equal to the cylindrical surface 138 between points 148 and 150, and also between points 152 and 154. Accordingly, this portion of the outer surface 146 of the handle 140 may have a radius of curvature equal to 37.9 mm. In another example, this portion of the outer surface 146 the handle 140 may have a radius of curvature measuring at or between 30 and/or 45 mm. However, this radius of curvature of the handle 140 may have any dimensional value, without departing from the scope of these disclosures.

Figure 4:
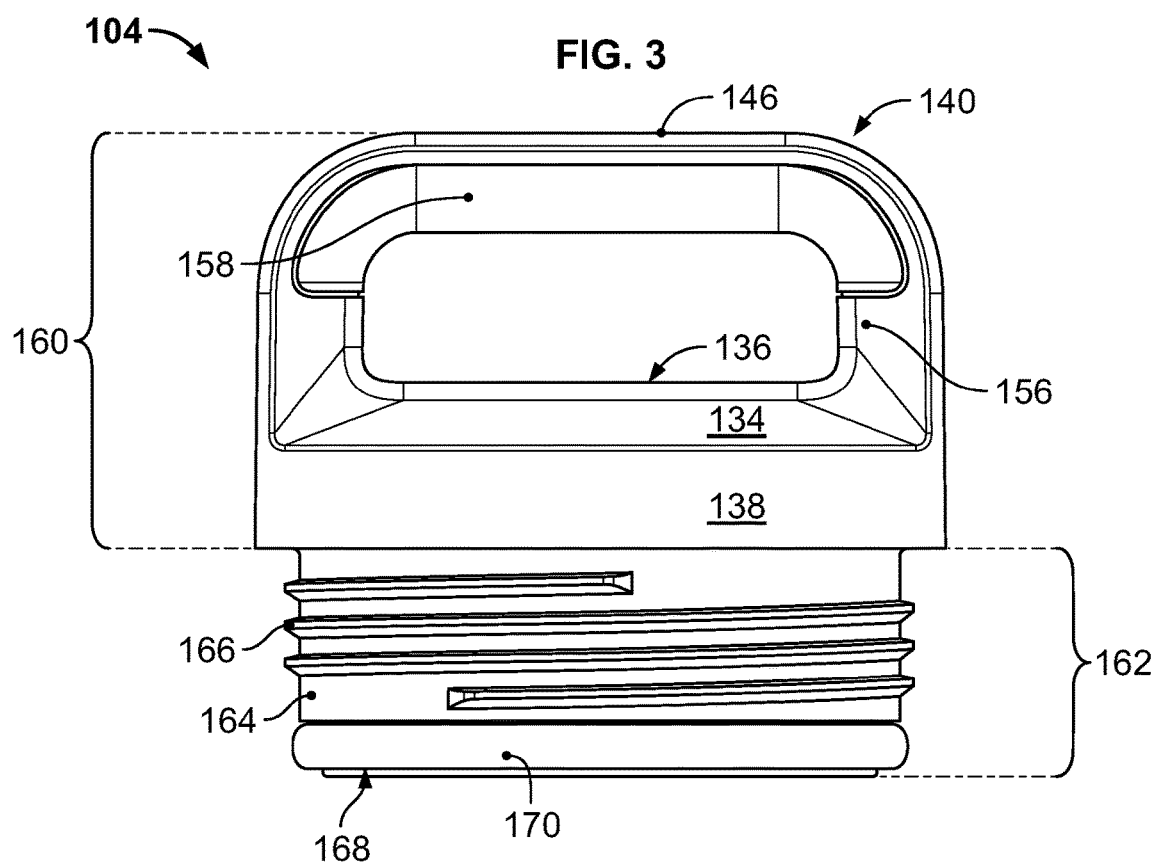
FIG. 4 depicts an elevation view of the lid of FIG. 3, according to one or more aspects described herein.

FIG. 4 depicts a front view of the lid 104. Accordingly, the handle 140 may have an inner surface 156 that has an overmolded grip 158. In one implementation, the overmolded grip 158 may be an elastomer, such as silicone rubber. However, any polymer may be utilized as the overmolded grip 158. Further, in another implementation, the inner surface 156 of the handle 140 may not include the grip 158, without departing from these disclosures. In one example, the cylindrical surface 138, the frustoconical surface 134, the circular top surface 136, and the handle 140 may be collectively referred to as an upper portion 160 of the lid 104. The lid 104 may have a lower portion 162 that has a cylindrical sidewall 164 with a threaded area 166 and a channel 168 extending around a lower area of the sidewall 164. The channel 168 may be configured to retain a gasket 170. In one example, a radially and axially extending flange 161 can extend from the lower portion 162 of the lid 104. The radially extending portion of the flange 163 in combination with a shoulder 165 forms the channel 168 for receiving the gasket 170. The hollow structure of the flange provides additional volume for the contents in the device. However, it is also contemplated that the channel could be formed as a reduced diameter portion in the lid 104 such that the reduced diameter portion is a solid non-hollow structure.

In one example, the gasket 170 may be a c-shaped or u-shaped gasket as shown in FIG. 5. However, different gasket geometries are contemplated in this disclosure. Additionally it is also contemplated that the gasket 170 could be placed at other locations along the lid 104. For example, the gasket 170 can be placed between the upper portion 160 and the lower portion 162 at the ridge formed by the upper portion 160 or in a middle area on the lower portion 162 to aid in sealing the container. Moreover, the gasket 170 could be omitted entirely.

FIG. 5 schematically depicts a cross-sectional view of the lid 104. In one implementation the lid 104 may be formed using a three-shot molding process, whereby the upper portion 160 may be injection molded with a first shot of polymer material. Further, the grip 158 may be overmolded onto the upper portion 160. Further, the lower portion 162 may be injection molded with a second shot of polymer material. The upper portion 160 may be rigidly-coupled to the lower portion 162 by a third shot of a polymer material at the interface 172 between the upper portion 160 and lower portion 162. This third shot of polymer material is schematically depicted in FIG. 5 as polymer interface element 173. In this way, polymer interface element 173 acts like a weld seam to join the upper portion 160 to the lower portion 162. This three-shot injection molding process may utilize three different polymer materials (one for each of the upper portion 160, lower portion 162, and polymer interface element 173). In another example, the three-shot injection molding process may utilize a same polymer material for the upper portion 160 and lower portion 162, and a different polymer material for the polymer interface element 173. In yet another example, the three-shot injection molding process may utilize a same polymer material for the upper portion 160, the lower portion 162, and the polymer interface element 173.

In other implementations, the lid 104 may be formed using additional or alternative forming processes. For example, the upper portion 160 may be formed by a first molding process (injection molding or otherwise) of a polymer material, and the lower portion 162 may be formed by a second molding process of a polymer material. Subsequently, the upper portion 160 may be coupled to the lower portion 162 by an alternative coupling process, such as, among others, spin welding, gluing, ultrasonic welding, an interference fit, a threaded coupling, or use of one or more fasteners (such as rivets, screws or bolts) or combinations thereof. It is also contemplated that the lid 104 can be formed by a single injection molding process. In various implementations, the lid 104 may be formed of a single, or multiple polymer materials, including, among others, Acrylonitrile Butadiene Styrene, polypropylene, polyethylene, polystyrene, polyvinyl chloride, nylon, polycarbonate or acrylic, or combinations thereof. Once coupled to one another, a sealed cavity 174 may be formed between the upper portion 160 and the lower portion 162.

The handle 140 may have an opening 176 that is configured to receive one or more fingers of the user. In one implementation, the opening 176 may have a height 178 and a width 180. In one example, the height 178 may measure 16.1 mm. In another example, the height 178 may measure at or between 10 and/or 20 mm. Further, the width 180 may measure 45 mm. In other examples, the width 180 may measure at or between 40 and/or 60 mm. As such, the opening 176 may have an opening area measuring between 400 and 1200 mm². In one example, the opening 176 may be configured to receive at least two fingers of an average-sized adult hand. In another example, the opening 176 may be configured to receive at least three fingers of an average-sized adult hand.

FIG. 6 depicts an enlarged cross-sectional view of the lid 104 removably coupled to the container 102. In particular, FIG. 6 depicts the upper threaded area 166 of the cylindrical sidewall 164 of the lid 104 received by a threaded sidewall 182 of the first inner wall 106 of the container 102. Engagement between the upper threaded area 166 and the threaded sidewall 182 seals the opening 118 at the first end 116 of the container 102 by urging the gasket 170 into contact with a lip structure 184 extending from the first inner wall 106 of the container 102. As such, the lip structure 184 is configured to compress the gasket 170 to seal the opening 118. In one example, the lid 104 may be removably-coupled to the container 102 by engaging the threaded sidewall 182 with the threaded area 166. As such, the lid 104 may be fully engaged with the container 102 upon rotation of the lid 104 relative to the container 102 by any number of revolutions, or by any fraction of a revolution. For example, the lid 104 may be fully engaged with the container 102 upon rotating the lid 104 by approximately ¼ of one full revolution, approximately ⅓ of one full revolution, approximately ½ of one full revolution, approximately 1 full revolution, approximately 2 full revolutions, approximately 3 full revolutions, at least 1 revolution, or at least five revolutions, among many others.

The cavity 174 may be configured to receive a mass of insulating material, such as a foam insert. This foam insert may, in one example, be polystyrene. However, additional insulating materials may be utilized with the disclosures described herein. In one implementation, the cavity 174 may be a vacuum cavity. In another example, the cavity 174 may be configured to receive a vacuum-insulated puck structure 186, as schematically depicted in FIG. 7. In one implementation, the vacuum-insulated puck may be in-molded into the cavity 174. Accordingly, the vacuum-insulated puck 186 may have a substantially cylindrical shape, and may be configured with a vacuum cavity (not depicted) configured to reduce heat transfer along an axial direction 188, and/or a radial direction 190. In certain examples, the vacuum-insulated puck 186 may be constructed from a metal or alloy, such as stainless steel. In other examples, the vacuum-insulated puck 186 may be constructed from a polymer, a ceramic, or a fiber-reinforced material, or combinations thereof. Further, the vacuum-insulated puck 186 may have any width 192 and/or height 194 dimensional values, without departing from the scope of these disclosures. In certain examples, the vacuum-insulated puck 186 may have a substantially cylindrical shape, but may have chamfered and/or filleted edges. In another example, the vacuum insulated puck 186 may have a shape configured to complement the shape of the lid 104 such that it has a cylindrical surface corresponding to the cylindrical surface 138, a frustoconical surface corresponding to the frustoconical surface 134, and a circular top surface corresponding to the circular top surface 136.

Figure 8:
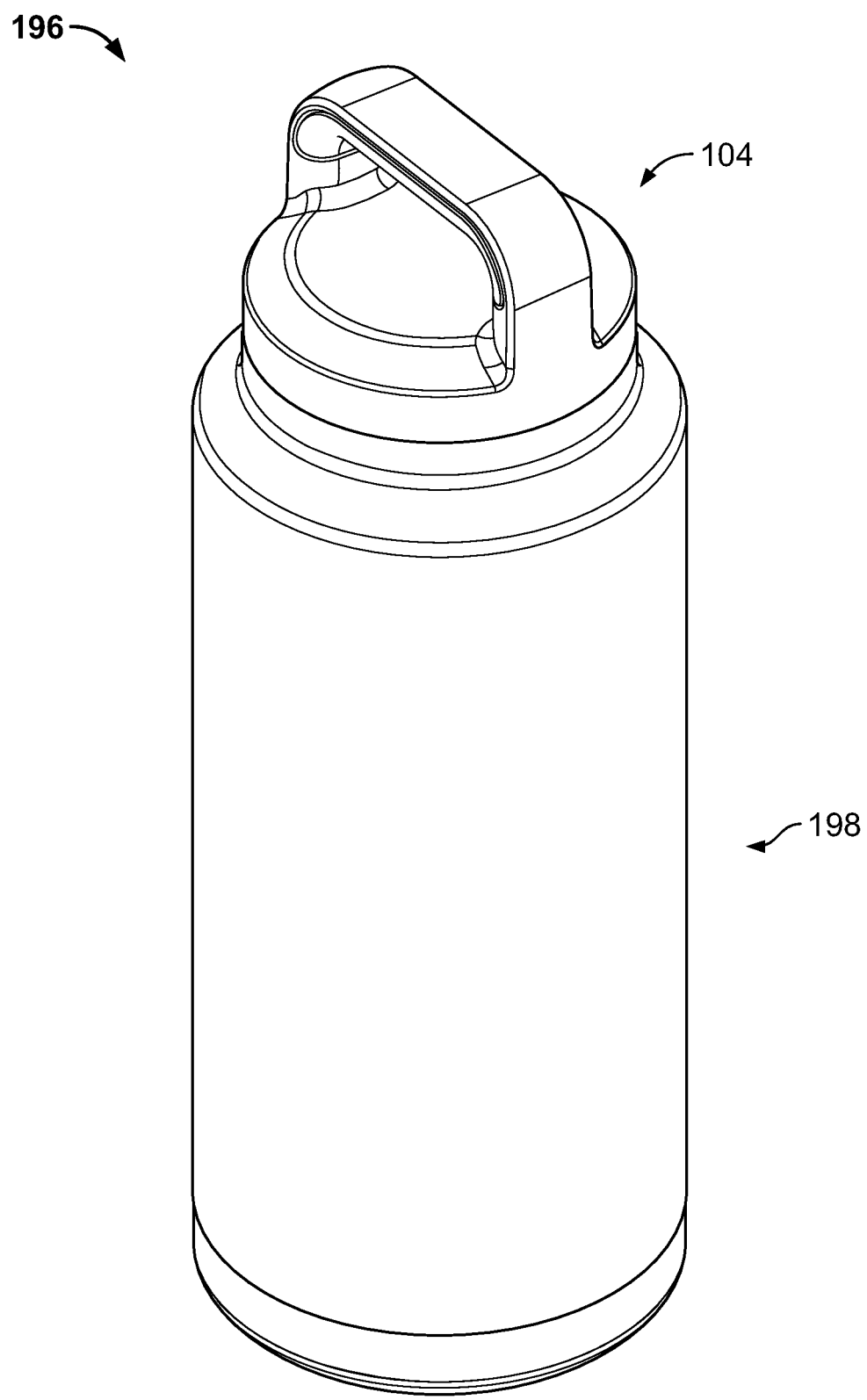
FIG. 8 depicts an isometric view of another example insulating device, according to one or more aspects described herein.
Figure 9:
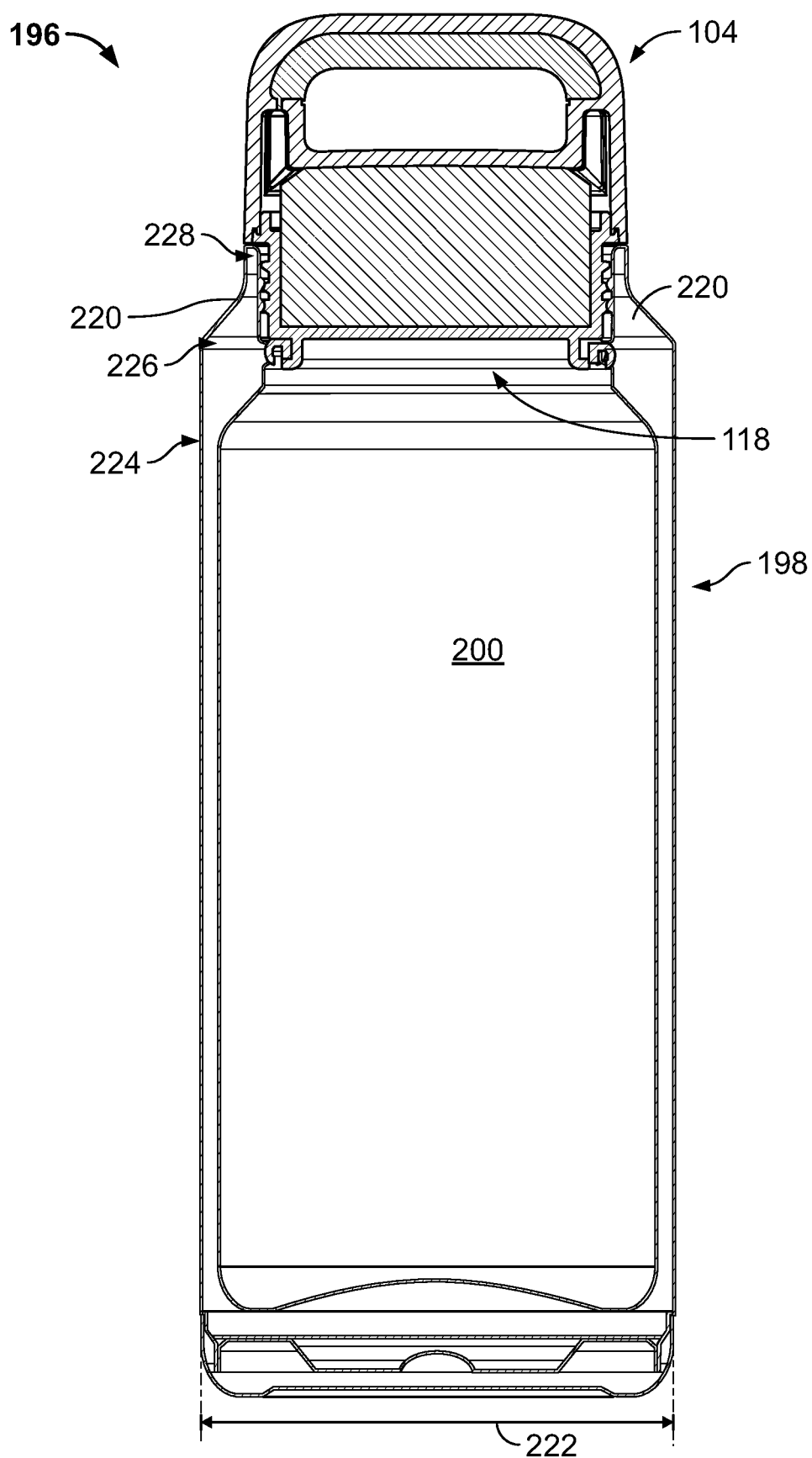
FIG. 9 depicts a cross-sectional view of the device of FIG. 8, according to one or more aspects described herein.

FIG. 8 depicts an isometric view of another device 196. Similar to device 100, device 196 utilizes lid 104, but may be embodied with a container 198 having a larger internal reservoir volume than container 102. FIG. 9 depicts a cross-sectional view of device 196. The reservoir 200 may have a volume of approximately 36 fl. oz. (approximately 1064 ml). However, the container 198 may utilize the same opening 118 as the container 102 in order to facilitate removable-coupling to the lid 104. In one example, the container 198 comprises a shoulder region 220.

As such, container 198 may have an outer diameter 222 greater than diameter 132 of lid 104. Accordingly, an outer wall 224 of the container 198 may taper between points 226 and 228 along a shoulder region 220. In one example, the shoulder region 220 may improve heat transfer performance of the container 198 (reduce a rate of heat transfer) when compared to a container 102. In particular, the shoulder region 220 may comprise insulation having lower thermal conductivity (higher thermal resistance/insulation) than the lid 104 that seals the opening 118. As such, insulating device 196 having outer diameter 222 greater than a diameter of the opening 118 provides for an increased surface area having the comparatively higher performance insulation (lower thermal conductivity insulation).

Figure 10:
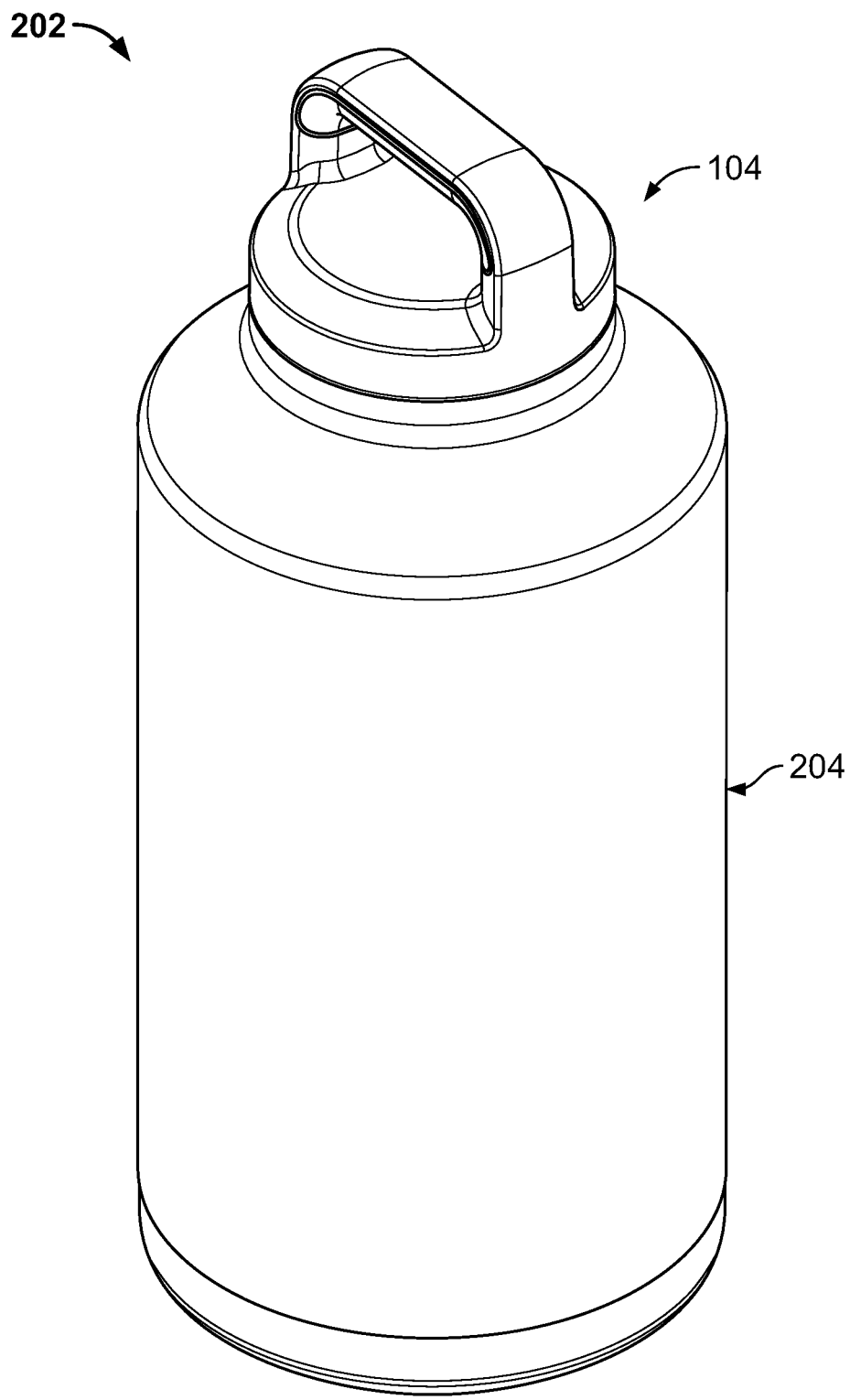
FIG. 10 depicts an isometric view of yet another example insulating device, according to one or more aspects described herein.
Figure 11:
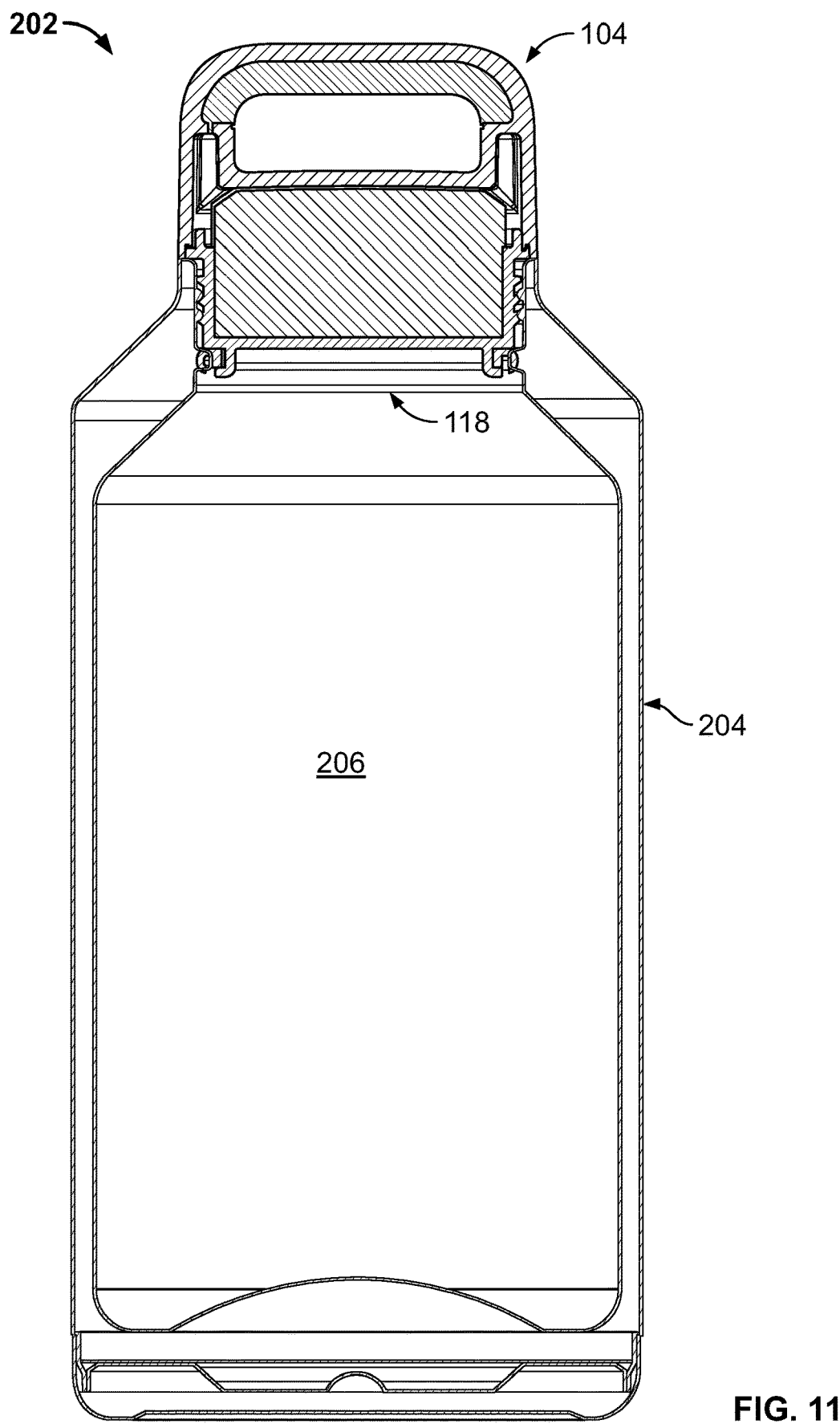
FIG. 11 depicts a cross-sectional view of the device of FIG. 10, according to one or more aspects described herein.

FIG. 10 depicts an isometric view of another device 202. Again, device 202 may utilize lid 104, but may be embodied with a container 204 that has a larger internal reservoir volume than container 102, and container 198. FIG. 11 depicts a cross-sectional view of the device 202. In one example, the reservoir 206 may have a volume of approximately 64 fl. oz. (approximately 1893 ml). However, the container 204 may utilize the same opening 118 as the container 102 in order to facilitate removable coupling to the lid 104.

Figure 12A:
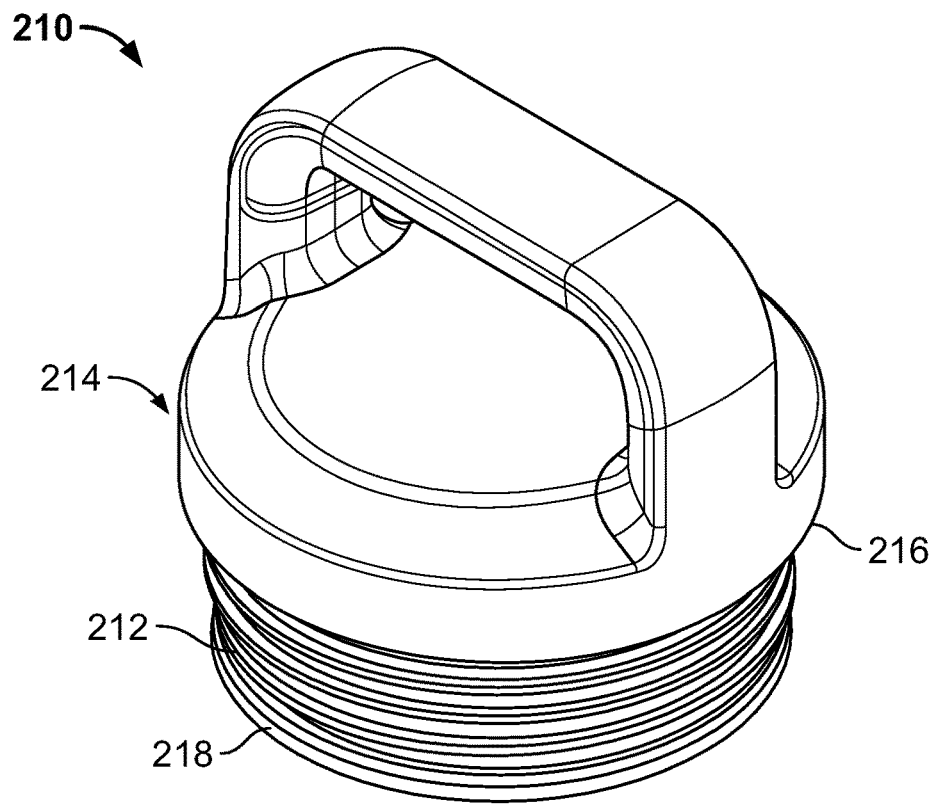
FIGS. 12A-12F depict another implementation of a lid structure, according to one or more aspects described herein.
Figure 12B:
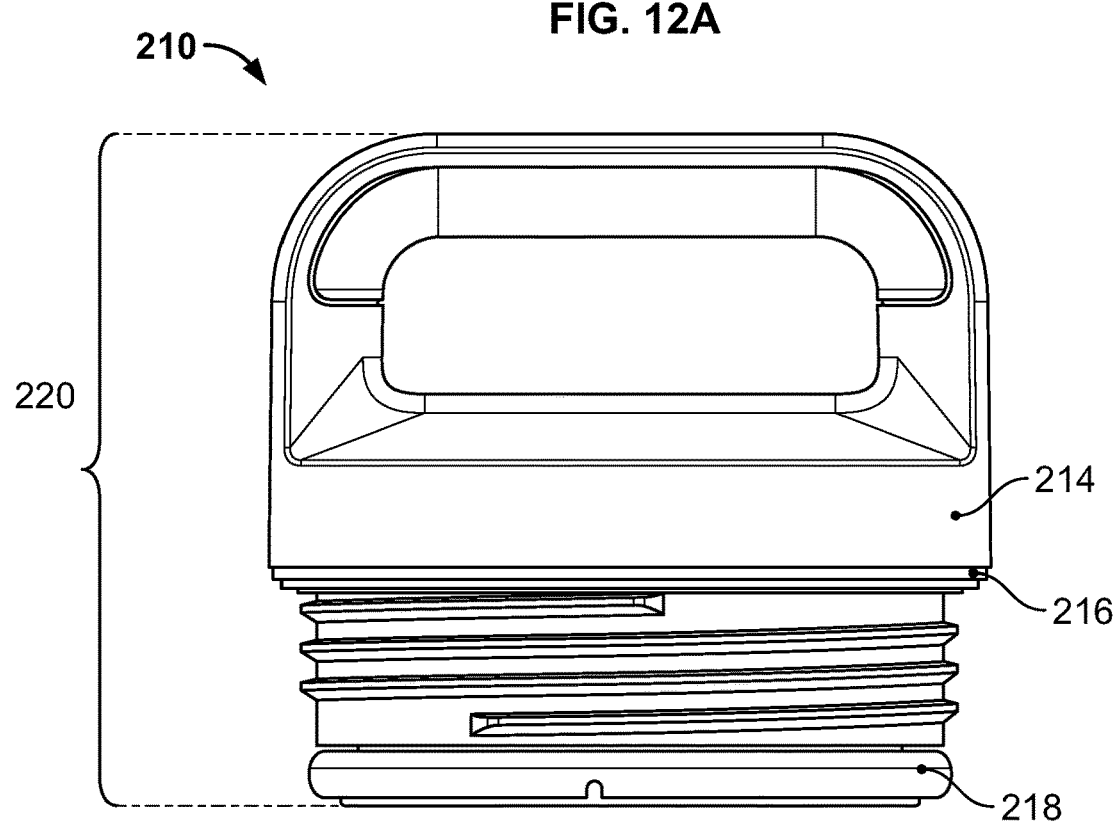

FIG. 12A depicts an isometric view another implementation of a lid 210. The lid 210 may be similar to lid 104, and may be configured to be removably-coupled to the container 102. The lid 210 may be embodied with a threaded structure 212 that may interface with the threaded sidewall 182 of the first inner wall 106 of the container 102 in order to removably-couple the lid 210 to the container 102. Lid 210 may also comprise an upper portion 214 that may be implemented with geometrical features similar to those described in relation to upper portion 160 of the lid 104. The lid 210 may also include an upper gasket structure 216 and a lower gasket structure 218. The upper gasket structure 216 may be configured to be compressed between the upper portion 214 and the top of the container 102. The upper gasket structure 216 may be embodied as an o-ring gasket structure comprising one or more polymeric materials. Further, the upper gasket structure 216 may be embodied with any dimensional values (e.g. inner diameter, outer diameter, and/or height), without departing from the scope of these disclosures. The lower gasket structure 218 may be configured to seal the opening 118 by compressing against the lip structure 184 of the container 102. FIG. 12B depicts an elevation view of the lid 210. It is contemplated that the lid 210 may be embodied with any dimensional values, without departing from the scope of these disclosures. In one example, the height 220 of the lid 210 may measure approximately 70.5 mm. In another implementation, the height 220 may range between 60 mm or less and 80 mm or more, without departing from the scope of these disclosures.

Figure 12E:
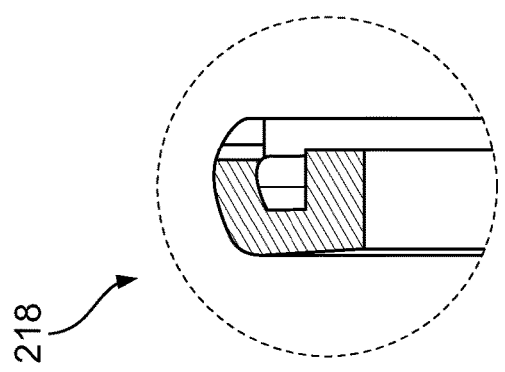
Figure 12D:
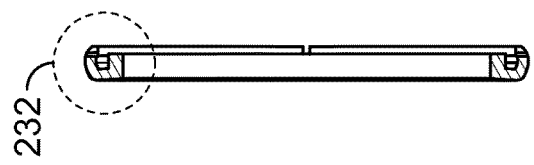
Figure 12C:
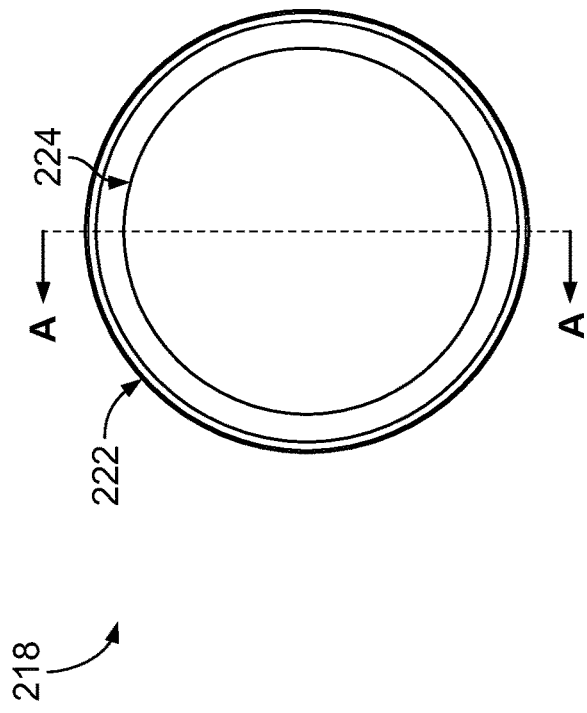
Figure 12F:
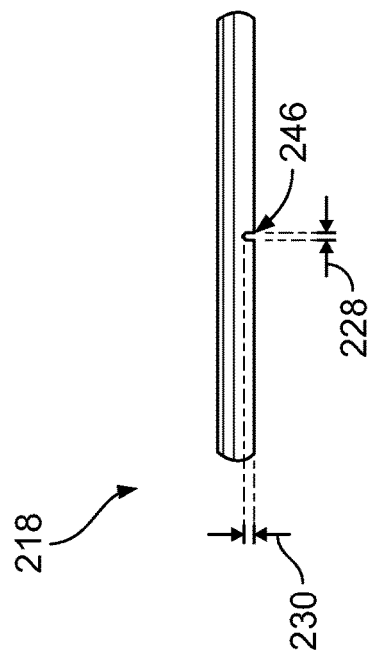

FIG. 12C depicts a top view of the lower gasket structure 218. In one implementation, the lower gasket structure 218 may have an outer diameter 242 and an inner diameter 244. Is contemplated that the outer diameter 242 and the inner diameter 244 may be implemented with any dimensions, without departing from the scope of these disclosures.

In one specific implementation, the outer diameter 242 may measure 61.8 mm. In another example, the outer diameter 242 may range between 50 mm or less and 70 mm or more. Further, the inner diameter 244 may measure 51.2 mm. In another example, the inner diameter 244 may range between 40 mm or less and 60 mm or more, without departing from the scope of these disclosures. FIG. 12D depicts an elevation view of the lower gasket structure 218.

Accordingly, the lower gasket structure 218 may be embodied with one or more radially extending vent structures 246. The vent structure 246 may be utilized to allow internal pressure within the reservoir 112 be released. In one example, the vent structure 246 may allow a gas pressure within the reservoir 112 to be lowered by allowing a portion of gas to escape through the threaded interface between structures 182 and 212, while preventing a liquid stored in the reservoir 112 from leaking. In one specific example, the lower gasket structure 218 may be embodied with four radially extending vent structures 246, equally spaced around the circumference of the lower gasket structure 218. It is further contemplated that the lower gasket structure 218 may be embodied with a single vent structure 246, or with two, three, or more than four vent structures 246, without departing from the scope of these disclosures. In one specific example, a vent structure 246 may comprise an opening having a height 230 that may measure 1.5 mm, and a width 248, that may measure 1 mm. It is contemplated, however, that the width 248 and height 230 may be embodied with any dimensional values, without departing from the scope of these disclosures. FIG. 12D depicts a cross-sectional view of the lower gasket structure 218 along line A-A from FIG. 12C. FIG. 12E schematically depicts a more detailed view of the elements within area 232 in FIG. 12D. Accordingly, FIG. 12E schematically depicts a compressible geometry of the gasket structure 218. In one implementation, the lower gasket structure 280 may comprise a c-shaped or u-shaped gasket geometry. Further the gasket structure 218 may be formed from one or more compressible, polymeric materials. In one specific example, the lower gasket structure 280 may have a 30 durometer hardness value. However, is contemplated that the lower gasket structure 218 may be embodied with different hardness values, without departing from the scope of these disclosures.

In one example, an insulating device formed of a material can include a container that has a first inner wall having a first end having a threaded sidewall and an opening extending into an internal reservoir for receiving liquid, and a second outer wall forming an outer shell of the container. The second outer wall can include a second end configured to support the container on a surface. The container can also include a sealed vacuum cavity forming an insulated double wall structure between the first inner wall and the second outer wall. The insulating device can also include a lid for sealing the opening of the container, with the lid having an upper portion that has a frustoconical surface between a circular top surface and a cylindrical surface. The upper portion of the lid may also have a handle that is molded to the frustoconical surface at two diametrically-opposed points. Further, the handle may have an outer surface with a portion of the outer surface having a circular curvature that is concentric with, and has a radius equal to, the cylindrical surface of the upper portion of the lid. The handle may also have an inner surface that has an overmolded grip. The upper portion of the lid may have a sidewall that has an upper threaded area configured to be received into the threaded sidewall of the first inner wall of the container, and a channel that extends around a lower area of the sidewall. A c-shaped gasket may be positioned within the channel. The c-shaped gasket may be compressed against a lip structure that extends from the first inner wall of the container when the upper threaded area of the sidewall is received by the threaded sidewall of the first inner wall. The upper portion of the lid may be coupled to the lower portion by a three-shot injection molding process, such that the upper portion may be injection molded with a first shot of polymer, the lower portion may be injection molded with a second shot of polymer, and the upper portion coupled to the lower portion by a third shot of polymer injected at the interface between the upper portion and the lower portion. A sealed cavity may be formed between the upper portion and the lower portion of the lid. The first inner wall, the second outer wall may be stainless steel or titanium.

In another example, an insulating device formed of a material can include a container that has a first inner wall having a first end having a threaded sidewall and an opening extending into an internal reservoir for receiving liquid, and a second outer wall forming an outer shell of the container. The second outer wall can include a second end configured to support the container on a surface. The container can also include a sealed vacuum cavity forming an insulated double wall structure between the first inner wall and the second outer wall. The insulating device can also include a lid for sealing the opening of the container, with the lid having an upper portion that has a frustoconical surface between a circular top surface and a cylindrical surface. The upper portion of the lid may also have a handle that is molded to the frustoconical surface at two diametrically-opposed points. Further, the handle may have an outer surface with a portion of the outer surface having a circular curvature that is concentric with, and has a radius equal to, the cylindrical surface of the upper portion of the lid. The upper portion of the lid may have a sidewall that has an upper threaded area configured to be received into the threaded sidewall of the first inner wall of the container, and a channel that extends around a lower area of the sidewall. A gasket may be positioned within the channel. The gasket may be compressed against a lip structure that extends from the first inner wall of the container when the upper threaded area of the sidewall is received by the threaded sidewall of the first inner wall. A sealed cavity may be formed by the upper portion of the lid being coupled to the lower portion.

A method of forming an insulating device can include one or more of forming a container with a first inner wall of a material defining a first end of the container, the first end having a threaded sidewall and an opening extending into an internal reservoir for receiving liquid, forming a second outer wall of the material into an outer shell for the container, the second outer wall defining a second end of the container configured to support the container on a surface. The method can also include sealing a vacuum cavity between the first inner wall and the second outer wall to create an insulated double wall structure. In one example, the method can include forming an upper portion of the lid that has a frustoconical surface between a circular top surface and a cylindrical surface. A handle to be formed that is integrally-molded to the frustoconical surface at two diametrically-opposed points, with the handle having an outer surface that has a portion with a circular curvature that is concentric with that has a radius equal to the cylindrical surface of the upper portion. The method may also overmold a grip on an inner surface of the handle. Further, the method may form a lower portion of the lid that has a sidewall with an upper threaded area to be received into the threaded sidewall of the first inner wall of the container, the lower portion may also have a channel extending around a lower area of the sidewall for retention of a gasket.

In another example, a closure may have an upper portion formed from a first amount of polymer material, a grip may be overmolded onto the upper portion, and a lower portion may be formed by injection molding a second amount of polymer material. The upper portion may be joined to the lower portion by a third amount of polymer material forming a weld seam. In one example, the second amount of polymer material and the third amount of polymer material may comprise the same material. In another example, the first amount of polymer material, the second amount of polymer material, and the third amount of polymer material may be different materials. In yet another example, the first amount of polymer material and the second amount of polymer material may be formed from a same polymer material, and the third amount of polymer material may be formed from a different polymer material. In another implementation. An insulating puck may be placed between the upper portion and the lower portion of the closure.

The present disclosure is disclosed above and in the accompanying drawings with reference to a variety of examples. The purpose served by the disclosure, however, is to provide examples of the various features and concepts related to the disclosure, not to limit the scope of the disclosure. One skilled in the relevant art will recognize that numerous variations and modifications may be made to the examples described above without departing from the scope of the present disclosure.

We claim:
1. An insulating device comprising:
   a container comprising:
      a first inner wall having a first end with a threaded sidewall and an opening extending into an internal reservoir;
      a second outer wall forming an outer shell of the container, the second outer wall having a second end configured to support the container on a surface;
      a sealed vacuum cavity forming an insulated double wall structure between the first inner wall and the second outer wall;
   a lid adapted to seal the opening of the container, the lid comprising:
      an upper portion having a frustoconical surface spaced between a circular top surface and a cylindrical surface, the upper portion further having a handle that is integrally-molded to the lid at two diametrically opposed points;
      a lower portion comprising:
         a sidewall having a threaded area adapted to be received into the threaded sidewall of the first inner wall of the container;
         an upper gasket positioned above the threaded area of the sidewall, wherein the upper gasket is configured to be compressed between the sidewall of the lid and a top portion of the container;
         a channel extending around a lower area of the sidewall configured to retain a lower gasket,
      wherein the lower gasket is configured to compress against a lip structure extending from the first inner wall of the container when the threaded area of the lower portion of the lid is received by the threaded sidewall of the first inner wall of the container,
      wherein the lower gasket has a c-shaped cross-section,
      wherein the lower gasket comprises a radially extending vent structure, and
      wherein the lower gasket and the radially extending vent structure are configured to compress in a radial direction when compressed against the lip structure.
2. The insulating device of claim 1, wherein the radially extending vent structure comprises four vent structures equally spaced around a circumference of the lower gasket.

3. The insulating device of claim 1, wherein the radially extending vent structure comprises a through-channel that extends between an inner diameter and an outer diameter of the lower gasket.

4. The insulating device of claim 3, wherein the radially extending vent structure further extends partially through an axial depth of the lower gasket.

5. The insulating device of claim 1, wherein the upper portion and the lower portion of the lid form a sealed cavity therebetween.

6. The insulating device of claim 5, wherein the sealed cavity contains a mass of insulating foam.

7. The insulating device of claim 1, wherein the upper portion and the lower portion of the lid comprise an injection molded polymer.

8. The insulating device of claim 1, wherein the handle has an outer surface, at least a portion of the outer surface having a circular curvature concentric with the cylindrical surface of the lid.

9. The insulating device of claim 1, wherein the handle has an inner surface having an overmolded grip.

10. The insulating device of claim 9, wherein the overmolded grip comprises an elastomer.

11. The insulating device of claim 1, wherein, the second outer wall comprises a dimple having a circular base.

12. The insulated device of claim 1 wherein the first inner wall and the second outer wall are stainless steel.

13. The insulated device of claim 1 wherein the channel is defined by a radially and axially extending flange, and a shoulder portion.

14. A lid structure of an insulating container, comprising:
an upper portion having a frustoconical surface spaced between a circular top surface and a cylindrical surface, the upper portion further having a handle that is integrally-molded to the lid at two diametrically opposed points, the handle further comprising:
an outer surface, at least a portion of the outer surface having a circular curvature concentric with the cylindrical surface; and
an inner surface having an overmolded grip;
a lower portion comprising:
a sidewall having a threaded area adapted to be received into a threaded sidewall of a container;
an upper gasket positioned above the threaded area of the sidewall, wherein the upper gasket is configured to be compressed between the sidewall of the lid and a first portion the container;
a channel extending around a lower area of the sidewall configured to retain a lower gasket,
wherein the lower gasket is configured to compress against a second portion of the container when the threaded area of the sidewall of the lid is received by the threaded sidewall of the container,
wherein the lower gasket has a c-shaped cross-section,
wherein the lower gasket comprises a radially extending vent structure, and
wherein the lower gasket and the radially extending vent structure are configured to compress in a radial direction when compressed against the second portion of the container.

15. The lid structure of claim 14, wherein the radially extending vent structure comprises four vent structures equally spaced around a circumference of the lower gasket.

16. The lid structure of claim 14, wherein the radially extending vent structure comprises a through-channel that extends between an inner diameter and an outer diameter of the lower gasket.

17. The lid structure of claim 14, wherein the upper portion and the lower portion of the lid form a sealed cavity therebetween.

18. The lid structure of claim 17, wherein the sealed cavity contains a mass of insulating foam.

* * * * *

UNITED STATES PATENT AND TRADEMARK OFFICE
CERTIFICATE OF CORRECTION

PATENT NO. : 11,272,809 B2
APPLICATION NO. : 15/804759
DATED : March 15, 2022
INVENTOR(S) : Petrillo et al.

It is certified that error appears in the above-identified patent and that said Letters Patent is hereby corrected as shown below:

On the Title Page

Page 4, Column 2, Other Publications, Line 24:
Delete "retreived" and insert --Retrieved--

Page 4, Column 2, Other Publications, Line 67:
Delete "Commision" and insert --Commission--

In the Specification

Column 3, Detailed Description, Line 59:
Delete "102" and insert --104--

Column 7, Detailed Description, Line 59:
After "disclosures.", delete "¶"

Signed and Sealed this
Eighth Day of November, 2022

Katherine Kelly Vidal
*Director of the United States Patent and Trademark Office*